(12) United States Patent
Klein

(10) Patent No.: US 6,185,590 B1
(45) Date of Patent: Feb. 6, 2001

(54) PROCESS AND ARCHITECTURE FOR USE ON STAND-ALONE MACHINE AND IN DISTRIBUTED COMPUTER ARCHITECTURE FOR CLIENT SERVER AND/OR INTRANET AND/OR INTERNET OPERATING ENVIRONMENTS

(75) Inventor: Laurence C. Klein, Silver Spring, MD (US)

(73) Assignee: Imagination Software, Silver Spring, MD (US)

( * ) Notice: Under 35 U.S.C. 154(b), the term of this patent shall be extended for 0 days.

(21) Appl. No.: 08/950,838

(22) Filed: Oct. 15, 1997

Related U.S. Application Data

(63) Continuation-in-part of application No. 08/911,083, filed on Aug. 14, 1997.
(60) Provisional application No. 60/028,129, filed on Oct. 18, 1996, provisional application No. 60/028,522, filed on Oct. 18, 1996, provisional application No. 60/028,128, filed on Oct. 18, 1996, provisional application No. 60/028,697, filed on Oct. 18, 1996, provisional application No. 60/028,639, filed on Oct. 18, 1996, and provisional application No. 60/028,685, filed on Oct. 18, 1996.

(51) Int. Cl.[7] .............................. G06F 13/00; G06F 15/00
(52) U.S. Cl. ............................................. 707/526; 345/329
(58) Field of Search ................................... 707/526, 513; 395/500, 701, 712, 92; 709/302, 300, 238, 245, 223

(56) References Cited

U.S. PATENT DOCUMENTS

| | | |
|---|---|---|
| 5,430,845 | 7/1995 | Rimmer et al. . |
| 5,465,364 | 11/1995 | Lathrop et al. . |
| 5,586,240 | 12/1996 | Khan et al. . |
| 5,613,090 * | 3/1997 | Willems ................................ 709/302 |
| 5,615,401 | 3/1997 | Harscoet et al. . |
| 5,680,618 * | 10/1997 | Freund ...................................... 707/7 |
| 5,774,720 * | 6/1998 | Borgendale et al. ................... 367/83 |
| 5,920,725 * | 7/1999 | Ma et al. .............................. 395/712 |

OTHER PUBLICATIONS

"Multiprotocol Management Agents: A Look At an Implementation and the Issues to Consider", Baktha Muralidharan, IEEE Journal on Selected Areas in Communications, vol. 11, No. 9, Dec. 1993.

"The Definition of Interoperability Architectures for Intelligent Devices Using Abstract Models", Elin L. Klaseen, et al., IEEE, (1995), pp. 237–245.

* cited by examiner

*Primary Examiner*—Joseph H. Feild
*Assistant Examiner*—Alford W. Kindred
(74) *Attorney, Agent, or Firm*—Irah H. Donner; Hale and Dorr LLP

(57) ABSTRACT

An image viewer process views at least one document image including an electronic document image, and performs viewing operations to the electronic document image. The process includes the step of selecting, by the user, one of a plurality of image viewing perspectives. Each of the plurality of image viewing perspectives provide the user the capability of viewing the document image in accordance with a different predefined user perspective. The process also includes the steps of selecting, by the user, using the image viewer process the document image to be viewed, and retrieving, by the image viewer process, the document image. The process also includes the step of displaying, by the image viewer process, the selected document image in accordance with an image viewing perspective selected by the user.

22 Claims, 23 Drawing Sheets

| IEngineManagement Interface | Arguments | Description |
|---|---|---|
| ActivateEngine | BOOL Activate | Activates or deactivates an engine. This interface element will cause an engine to load itself to or unload itself from memory. |
| IsEngineActivated | | Determine whether the engine has been successfully loaded into memory. |

FIG. 7

| IEngineManagement Interface | Arguments | Description |
|---|---|---|
| SetSetting | DWORD Setting VARIANT Value | Sets the setting Setting to a value of Value. the Setting argument is a unique number that represents a specific setting type. The Value argument is a union argument type that can accept any style argument, including an array of elements. |
| GetSetting | DWORD Setting VARIANT *Value | gets the setting Setting and places the value in Value. the Setting argument is a unique number that represents a specific setting type. The Value argument is a union argument type that can accept any style argument, including an array of elements. |

FIG. 10

| IEngineManagement Interface | Arguments | Description |
|---|---|---|
| Function | DWORD Setting VARIANT * Value | Initiate the function as represented by the Setting argument, using a variable number of arguments in using the Value array. |

FIG. 12

| FILE 1 | FILE 2 | FILE 3 |
|---|---|---|
| ENGINE FUNCTION A | ENGINE DLL A | ENGINE SETTING A |
| ENGINE FUNCTION B | ENGINE DLL B | ENGINE SETTING B |
| ENGINE FUNCTION C | ENGINE DLL C | ENGINE SETTING C |
| ⋮ | ⋮ | ⋮ |

FIG. 9

PROCESS AND ARCHITECTURE FOR USE ON STAND-ALONE MACHINE AND IN DISTRIBUTED COMPUTER ARCHITECTURE FOR CLIENT SERVER AND/OR INTRANET AND/OR INTERNET OPERATING ENVIRONMENTS

RELATED APPLICATIONS

This application is a continuation-in-part application of U.S. patent application Ser. No. 08/911,083 filed on Aug. 14, 1997, to the same applicant, and hereby incorporated by reference.

This application is related to, and claims priority from, the following copending provisional applications, the details of which are hereby incorporated by reference: COMPUTER PROCESS FOR IMAGE CONTROL, Applicant: Laurence C. Klein, Filed: Oct. 18, 1996, Serial Number 60/028,129; COMPUTER PROCESS FOR IMAGE CONTROL, Applicant: Laurence C. Klein, Filed: Oct. 18, 1996, Serial Number 60/028,522; COMPUTER PROCESS FOR ENGINE BENCHMARKING, Applicant: Laurence C. Klein, Filed: Oct. 18, 1996, Serial Number 15 60/028,128; COMPUTER PROCESS FOR DESK TOP IMAGING, Applicant: Laurence C. Klein, Filed: Oct. 18, 1996, Serial Number 60/028, 697; COMPUTER PROCESS FOR IMAGE VIEWING, Applicant: Laurence C. Klein, Filed: Oct. 18, 1996, Serial Number 60/028,639; COMPUTER PROCESS FOR IMAGE CAPTURE, Applicant: Laurence C. Klein, Filed: Oct. 18, 1996, Serial No. 60/028,685.

FIELD OF THE INVENTION

The present invention is generally related to a computer architecture and process for image viewing in a stand-alone and/or distributed environment, and more particularly to a computer architecture and process for image viewing using a substantially uniform management in a stand-alone and/or distributed computing environment including, for example, client server and/or intranet and/or internet operating environments.

BACKGROUND OF THE RELATED ART

A "C" or "C++"-Level API (hereinafter "C" Level), which is the native language and interface for a vast repository of core technologies from small software vendors and research laboratories, are unique to each designer. The designer of a text retrieval "C"-API will generally implement an interface that is completely different than a second inventor creating a "C"-level API for OCR.

Every "C"-level API is unique, both in its choice of API syntax as well as its method for implementing the syntax. Some API's consist of one or two functions that take parameters offering options for different features offered by the technology. Other APIs consist of hundreds of functions with few arguments, where each function is associated with a particular feature of the core technology. Other APIs provide a mixture of some features being combined with one function with many arguments, while other features are separated into individual function calls.

Without any constraints, each designer of a core technology chooses to implement his or her technology with an interface that is suitable to the subject or simply was the most expedient choice of the moment. Since there are no constraints, a "C"-level API has a totally unpredictable interface that can often be the hindrance to using the core technology.

Additionally, every API manages errors differently further complicating the problems described above. Some APIs return a consistent error code for each function. Error management in this case is very organized and manageable. Other APIs return error codes as one of the parameters passed to the function. There are APIs that mix the choice of error management and have some functions return an error code while other functions pass the error code as a parameter of a function. Errors can also be managed by a callback function, eliminating the need for passing any error code as part of the function. In some instances of a poorly implemented API the errors are not passed back at all.

Every engine, such as a text retrieval or an OCR (Optical Character Recognition) engine, has a unique interface. This interface is generally a "C"-level API (Application Program Interface). Further, an API can at any time be synchronous, asynchronous, manage one or more callbacks, require input, pass back output, carry a variety of different styles of functions, return values or not return values, and implement the unpredictable. This unpredictability in APIs further compounds the problem of developing a sane way of interfacing between components and APIs.

To date, because of the complexities of "C"-level APIs and components interfacing thereto, the only way to create a component out of an existing "C"-level API is to have an experienced programmer in the field to do the work. Humans can intelligently analyze an API, and create a component based on intelligent decisions and experiences. In most cases, the learning curve for understanding and integrating a new engine can be one man-month to several man-years and generally requires highly experienced "C" programmers. Requiring a human to perform the necessary work is costly, and subject to real-life human constraints.

Since there is no structure or format for implementing "C"-level APIs, the ability to automatically transform a unique API into a standard component would seem impossible, since that would take a nearly-human level of intelligence.

I have determined that a component factory, if it is to be truly automated or manually expedited, must be able to take any "C"-level API and transform it into a component.

I have also determined an efficient and workable design for an architecture to define the migration path for any "C"-level API into a component.

I have also determined that it is desirable to develop software tools for automatically generating reusable software components from core software technologies, thus making these software technologies available to a much larger user base.

I have further determined that it is desirable to design a distributed computer architecture and process for manually and/or automatically generating reusable software components. The computer architecture may be implemented using a client server and/or intranet and/or internet operating environments.

I have further determined that it is desirable to design a computer architecture and process for image viewing in a stand-alone and/or distributed environment. The computer architecture and process optionally uses a substantially uniform management layer in a stand-alone and/or distributed computing environment including, for example, client server and/or intranet and/or internet operating environments.

SUMMARY OF THE INVENTION

One would expect the translating a "C"-level API from its native state into a component would require human-level intelligence. This is mainly because "C"-level APIs have virtually no constraints as to how they can be implemented. This means that there are an infinity variations of APIs, which can only be managed by human-level intelligence. While this point is true, I have determined that the appropriate solution starts at the other side of the equation, which is the component itself.

My solution starts out with a definition of a component that can sustain the feature/function requirements of any API. In other words, the interface of a generic component can be defined such that the features and functions of virtually any API can be re-implemented within its bounds. The two known end-points are, for example, the "C"-level API that generally starts with each component (although other programming languages may also be used and are within the scope of the present invention), and the component interface that represents any set of features/functions on the other side. The component factory migrates the original "C"-level API from its original state into the generic interface defined by the topmost layer. The first feature that can be demonstrated is that there is a topmost layer that can define a component interface that can represent the features/functions of most core technologies.

The component factory migrates the "C"-level API to the topmost level. Doing this in one large step would be impossible since the "C"-level API has a near-infinite variety of styles. However, the architecture advantageously has enough well-defined and well-structured layers for implementing the topmost component interface, for creating the component factory.

The computer architecture is designed for managing a diverse set of independent core technologies ("engines") using a single consistent framework. The architecture balances two seemingly opposing requirements: the need to provide a single consistent interface to many different engines with the ability to access the unique features of each engine.

The benefit of the architecture is that it enables a company to rapidly "wrap" a sophisticated technology so that other high-level developers can easily learn and implement the core technology. The computer architecture is therefore a middleware or enabling technology.

Another benefit of the architecture is that it provides a high-level specification for a consistent interface to any core technology. Once a high-level developer learns the interface described herein for one engine, that knowledge is easily transferable to other engines that are implemented using the architecture. For example, once a high-level developer learns to use the computer architecture for OCR (Optical Character Recognition), using the computer architecture for other engines, such as barcode recognition or forms processing, is trivial.

The architecture described herein is, at once, a framework for rapidly wrapping sophisticated technologies into high-level components, as well as a framework for high-level developers to communicate with a diverse set of engines. The creating of a component factory is based on the fact that the architecture defines a clear path for "wrapping" any C-level API into a component using simple structures and many rote steps. This process is currently being done in an inefficient manner by a programmer in the field.

In addition, the method described herein for creating a component factory creates a well-defined multi-tiered architecture for a component and automates, substantially automates, or manually expedites hereinafter automate the process of migrating a "C"-API from its native state through the various tiers of the architecture resulting in a standardized component. Advantageously, the method described herein does not base the component factory on making human-level intelligent decisions on how to translate a "C"-API into a component. Rather, by creating a well-defined architecture described below that is multi-tiered, the method is a series of incremental steps that need to be taken to migrate the "C"-API from one tier within the architecture to the next. In this way each incremental step is not a major one, but in sequence the entire series of steps will result in a component.

Since each step of migration is not a major one, the chances for automating these steps is significantly higher and the likelihood of being able to create the component factory becomes feasible. This approach is in fact what makes the method cost-effective, since the alternative approach, i.e., computer-generated human-level decision making, has many years before becoming sophisticated enough to replace humans in any realistic decision-making process.

The main features of the architecture are twofold:
1) Defining system architecture that describes in detail how to implement a component from a "C"-level API;
2) Creating a component factory by automating the migration of a "C"-level API from one tier within the architecture to the next. The latter feature is the key to actually making the component factory feasible. With a fixed architecture that can be used to implement a "C"-level API as a component (using a programmer), that same architecture can be used as the basis for the component factory model.

In order to make the component factory, each step of the architecture needs to be designed to facilitate automation or manually expedited. In other words, I have determined that automating/expediting the process of taking the original "C"-level API and migrating it to a Level 1 layer, and then a Level 1 to a Level 2, and then a Level 2 to a Level 3 layer, and so on, the component has been implemented automatically or more efficiently. The component factory is therefore a sum of the ability to automate migrating the "C"-level API from one layer to the next within a well-defined architecture for implementing components.

There are numerous core technologies, such as text-retrieval and ICR (Intelligent Character Recognition), that have already been implemented, and are only available as "C"-level APIs. Many, if not most, core technologies are first released exclusively as "C"-level APIs. While there are integrators and corporations who have the team of technologists who can integrate these "C"-level APIs in-house, most companies are looking for component versions that can be implemented at a much higher level.

Therefore, many of the core technologies that are only available in a "C"-level API are not being used due to their inaccessible interface. The benefit of the component factory is that it can rapidly make available core technologies implemented as "C" APIs that would otherwise be underutilized or dormant in research labs by converting them to high-level components that can be used by millions of power-PC users.

With the advent of the World Wide Web (WEB) this opportunity has increased exponentially. The WEB is now home to a vast number of WEB authors with minimal formal training who can implement HTML pages and build web sites. One of the fundamental technologies for extending the capability of the WEB from simple page viewing to interactive and sophisticated applications is components.

A component extends the capability of HTML by enabling a WEB author to add core technology as a pre-packaged technology. Since components are fundamental to the growth and usability of the WEB, having a component factory that can translate "C"-level toolkits into components that are then usable within WEB sites opens a vast and new worldwide market to these technologies.

It is a feature and advantage of the present invention to implement a component factory, that is automated or manually expedited.

It is another feature and advantage of the present invention to be able to take any "C"-level API and transform it into a component.

It is another feature and advantage of the present invention to define an efficient and workable design for an architecture to provide the migration path for any C-level API into a component.

It is another feature and advantage of the present invention to develop software tools for automatically generating reusable software components from core software technologies.

It is another feature and advantage of the present invention to develop software tools to make software components available to a much larger user base.

It is another feature and advantage of the present invention in providing a distributed computer architecture and process for manually and/or automatically generating reusable software components.

It is another feature and advantage of the present invention in providing a distributed computer architecture and process for manually and/or automatically generating reusable software components where the computer architecture is implemented using a client server and/or intranet and/or internet operating environments.

It is another feature and advantage of the present invention in providing a computer architecture and process for image viewing in a stand-alone and/or distributed environment.

It is another feature and advantage of the present invention in providing a computer architecture and process that uses a substantially uniform management layer in a stand-alone and/or distributed computing environment including, for example, client server and/or intranet and/or internet operating environments.

The present invention is based, in part, on my discovery that it is possible to make the component factory, and that each step of the architecture is designed to facilitate automation or manually design of components. The present invention is also based, in part, on my discovery that by automating/expediting the process of taking the original "C"-level API and migrating it to a Level 1 layer, and then a Level 1 to a Level 2, and then a Level 2 to a Level 3 layer, and so on, the component has been implemented automatically and/or more manually efficiently. The component factory is therefore a sum of the ability to automate migrating the "C"-level API from one layer to the next within a well-defined architecture for implementing components.

The present invention is also based, in part, on my discovery that the object manager and engine object component layers may be advantageously be designed to operate independently, thereby making possible a distributed computing environment, as described below in detail. I have further discovered that an efficient method of implementing the engine object component layer is by using pre-populated tables/files. I have further discovered that the engine management layer may be advantageously divided into a three layer structure of load/unload engine, dynamic linking engine function calls, and initialize engine setting.

In accordance with one embodiment of the invention, a computer implemented process migrates a program specific Application Programmer Interface (API) from an original state into a generic interface by building an object for each engine. The object provides substantially uniform access to the engine and engine settings associated with the engine. The computer implemented process includes the step of providing an engine management function interfacing with the program specific API. The engine management function furnishes a protective wrapper for each function call associated with the engine, trapping errors, and provides error management and administration to prevent conditions associated with improper engine functioning. The process optionally includes the step of providing an engine configuration function transforming API calls received from the program specific API into standardized calls. The engine configuration function provides additional functionality, including safely loading and unloading the engine. The process optionally includes the step of providing an engine function managing the standardized calls for each engine, thereby providing substantially uniform access to the engine and the engine settings associated with the engine.

In accordance with another embodiment of the invention, a computer implemented method migrates at least one program specific Application Programmer Interface (API) from an original state into a generic interface by building an object for each engine. The object provides substantially uniform access to the engine and engine settings associated with the engine. The computer implemented method includes the steps of defining a substantially consistent interface for individual object components that represent diverse technologies, and migrating a plurality of engines to the consistent interface. The computer implemented method also includes the step of substantially automatically and/or substantially uniformly, managing the individual object components using a predefined object manager and the consistent interface.

In accordance with another embodiment of the invention, a computer architecture migrates at least one program specific Application Programmer Interface (API) from an original state into a generic interface by building an object for each engine. The object provides substantially uniform access to the engine and engine settings associated with the engine. The computer architecture includes an engine management layer interfacing with the program specific API and providing engine management and administration, an engine configuration layer transforming API calls received from the program specific API into standardized calls, and an engine layer managing the standardized calls for each engine.

In accordance with another embodiment of the invention, an engine management layer configures a computer architecture to perform one or more computer implemented or computer assisted operations. The computer operations include one or more of loading and unloading engine dynamic link libraries into and out of memory for each engine, mapping at least one engine function to at least one corresponding engine object, providing general error detection and error correction for each engine, determining and matching arguments and returning values for mapping the at least one engine function to the at least one corresponding engine object, and/or managing error feedback from the at least one program specific API.

In accordance with another embodiment of the invention, a distributed computer system migrates a program specific Application Programmer Interface (API) from an original state into a generic interface by building an object for each engine. The object provides substantially uniform access to the engine and engine settings associated with the engine. The distributed computer system includes a server configured to include at least one engine having an engine interface providing one or more features to be executed, and at least one engine component configured to execute the one or more features of the engine by mapping a substantially consistent interface to the engine interface of the engine. The distributed computer system also includes at least one client configured to be connectable to the server and optionally configured to be connectable to another server. The client includes an object manager layer communicable with and managing the at least one engine component stored on the server via the substantially consistent interface.

In accordance with another embodiment of the invention, a distributed computer implemented process migrates a program specific Application Programmer Interface (API) from an original state into a generic interface by building an object for each engine. The object provides substantially uniform access to the engine and engine settings associated with the engine. The computer implemented process includes the step of providing, on a server, at least one engine having an engine interface, and providing one or more features to be executed. The computer implemented process also includes the step of providing, on at least one of the server and another server connectable to the server, at least one engine component configured to execute the one or more features of the engine by mapping a substantially consistent interface to the engine interface of the engine. The computer implemented process also includes the step of providing, on a client configured to be connectable to the server and optionally configured to be connectable to the another server, an object manager layer communicable with and managing the at least one engine component via the substantially consistent interface.

In accordance with another embodiment of the invention, an image viewer process views at least one document image including an electronic document image, and performs viewing operations to the electronic document image. The process includes the step of selecting, by the user, one of a plurality of image viewing perspectives. Each of the plurality of image viewing perspectives provide the user the capability of viewing the document image in accordance with a different predefined user perspective. The process also includes the steps of selecting, by the user, using the image viewer process the document image to be viewed, and retrieving, by the image viewer process, the document image. The process also includes the step of displaying, by the image viewer process, the selected document image in accordance with an image viewing perspective selected by the user.

In accordance with another embodiment of the invention, a computer readable tangible medium is provided that stores the process thereon, for execution by the computer.

In accordance with another embodiment of the invention, a computer readable tangible medium is provided that stores an object thereon, for execution by the computer.

These together with other objects and advantages which will be subsequently apparent, reside in the details of construction and operation as more fully herein described and claimed, with reference being had to the accompanying drawings forming a part hereof wherein like numerals refer to like elements throughout.

BRIEF DESCRIPTION OF THE DRAWINGS

FIG. 7 is a table illustrating the engine management specification with definitions;

FIG. 9 is an illustration of exemplary tables used to drive the three functions of the engine management layer illustrated in FIG. 8;

FIG. 10 is an exemplary table illustrating the engine configuration specification with definitions;

FIG. 12 is an exemplary table illustrating the engine functionality specification with definitions;

NOTATION AND NOMENCLATURE

Figure 1:
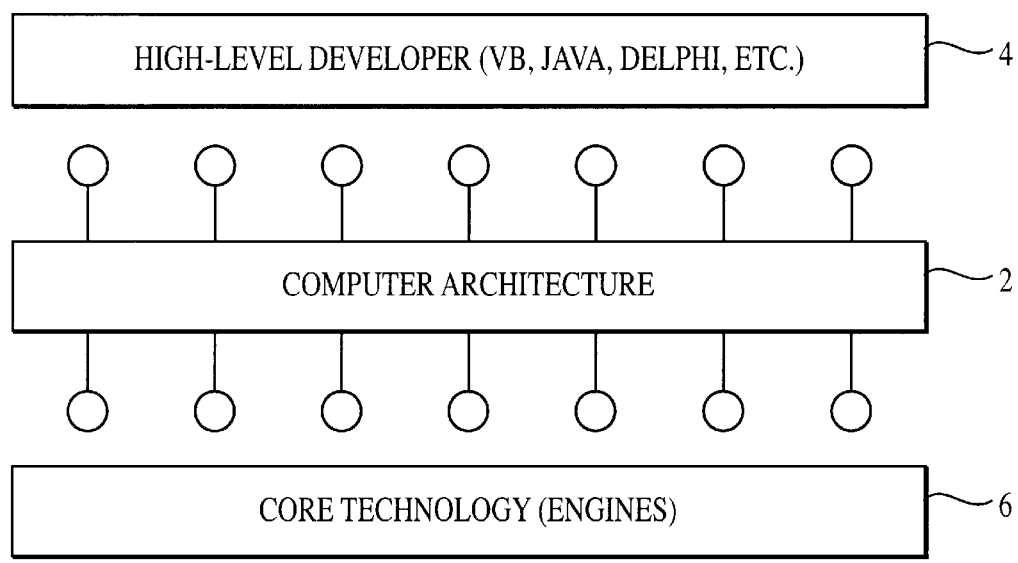
FIG. 1 is an illustration of the placement and/or use of the computer architecture and/or method of the present invention.

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

BEST MODE FOR CARRYING OUT THE INVENTION

The purpose of the computer architecture and process described herein is to create a component factory that can automatically generate reusable software components from sophisticated core software technologies. Many, if not most, core software technologies, such as OCR (Optical Character Recognition) or barcode recognition, are designed and implemented using a "C"-language API (Application Program Interface). The technology is often complex, requiring months of trial-and-error to correctly develop application systems using the technology. While there are millions of Intranet developers and power-PC users who are capable of assembling component-based systems, I have determined that there are relatively few "C" programmers (estimated at less than 100,000) who can learn and implement application software with these complex 'C'-level API's. It is therefore desirable to develop software tools for automatically generating reusable software components from core software technologies thus making these software technologies available to a much larger user base.

Since I have determined that there is no structure or format for implementing "C"-level API's, the ability to automatically transform a unique API into a standard component would seem impossible since that would take a nearly-human level of intelligence. To date, the only way, I am aware, to create a component out of an existing API is to have an existing programmer in the field do the work for each API. Humans can intelligently analyze an API and create a component based on intelligent decisions tempered by experience. The challenge of creating a component factory is the challenge of partially or substantially recreating the component design and formulating effective implementation decisions.

One would expect the translating a "C"-level API from its native state into a component would require human-level intelligence. This is mainly because "C"-level APIs have virtually no constraints as to how they can be implemented. This means that there are an infinity variations of APIs, which can only be managed by human-level intelligence. While this point is true, I have determined that the appropriate solution starts at the other side of the equation, which is the component itself.

My solution starts out with a definition of a component that can sustain the feature/function requirements of any API. In other words, the interface of a generic component can be defined such that the features and functions of virtually any API can be re-implemented within its bounds. The two known end-points are the "C"-level API that started with, and the component interface that represents any set of features/functions on the other side.

I have also determined that one solution for creating a computer architecture and process for implementing a component factory is to create a well-defined multi-tiered systems architecture for a component and to automate, substantially automate, or manually expedite from its native state through the various tiers of the systems architecture resulting in a standardized or substantially standardized component. Advantageously, this solution is not based on making human-level intelligent decisions on how to translate a 'C'-level API into a component. Rather, by starting with a well-defined systems architecture that is multi-tiered, a series of incremental steps that migrates a C-level API from one tier within the systems architecture to the next may be performed, and which are facilitated using the architecture and/or process described herein.

Advantageously, each incremental step is not a major one, but in sequence the entire series of steps will result in a usable component. Since each step of migration is not a major one, the chances of automating these steps is significantly higher and the likelihood of being able to create the component factory becomes more feasible.

The fundamental building blocks of the computer architecture and process are twofold:

1) To define a systems architecture that describes in detail how to implement a component from a C-level API
2) To create a component factory by automating, substantially automating, or manually expediting the migration of a C-level API from one tier within the architecture to the next.

The building blocks are the keys or important to actually making the component factory feasible.

Significantly, the computer architecture and processes described herein have application to the Intranet and document market marketplace. Corporations are embracing internet computing technologies to create enterprise-level Intranets and Extranets. Using standard browser technologies, corporations and government entities are rapidly adopting the internet computing model and are developing enterprise applications by assembling standard Microsoft specified Active X components. These are not "C" programmers; rather they are typical power PC users. Further availability of reusable components would only fuel this development.

The general outline for creating a component factory is described below in detail. It is important to note that automatically, substantially automatically, or manually building a component is neither obvious nor guaranteed. As will be described below in detail, automating or substantially automating the building of a component consists of automating individual steps that comprise the component architecture. However, in today's application environment, any amount of automation will dramatically increase the efficiencies of building a component The computer architecture is designed for managing a diverse set of independent core technologies ("engines") using a single consistent framework. The architecture balances two seemingly opposing requirements: the need to provide a single consistent interface to many different engines with the ability to access the unique features of each engine.

The benefit of the architecture is that it enables a company to rapidly "wrap" a sophisticated technology so that other high-level developers can easily learn and implement the core technology. The computer architecture is therefore a middleware or enabling technology, as illustrated in FIG. 1.

As illustrated in FIG. 1, computer architecture 2, described below in detail, is a middle layer between high level developer programs 4 (such as C-level APIs, or other programs having similar characteristics) and are technology/component engines 6 (such as OCR, bar code recognition, and other components having similar characteristics).

Another benefit of the architecture is that it provides a high-level specification for a consistent interface to any core technology. Once a high-level developer learns the interface described herein for one engine, that knowledge is easily transferable to other engines that are implemented using the architecture. For example, once a high-level developer learns to use the computer architecture for OCR (Optical Character Recognition), using the computer architecture for other engines, such as barcode recognition or forms processing, is trivial.

In summary, the architecture and process described herein is at once a framework for rapidly wrapping sophisticated technologies into high-level components, as well as a framework for high-level developers to communicate with a diverse set of engines. The creating of a component factory is based on the fact that the architecture defines a clear path for "wrapping" any C-level API into a component using simple structures and many rote steps. This process is currently being done in an inefficient manner by a programmer in the field.

The method described herein for creating a component factory creates a well-defined multi-tiered architecture for a component and automates, substantially automates, or manually expedites (hereinafter "automates") the process of migrating a "C"-API from its native state through the various tiers of the architecture resulting in a standardized component.

Advantageously, the method described herein does not base the component factory on making human-level intelligent decisions on how to translate a "C"-level API into a component. Rather, by creating a well-defined architecture described below that is multi-tiered, the method is a series of incremental steps that need to be taken to migrate the "C"-level API from one tier within the architecture to the next. In this way each incremental step is not a major one, but in sequence the entire series of steps will result in a component.

Since each step of migration is not a major one, the chances for automating these steps is significantly higher and the likelihood of being able to create the component factory becomes feasible. This approach is in fact what makes the method cost-effective, since the alternative approach, i.e., computer-generated human-level decision making, is currently unavailable and would require much effort, if at all possible, to replace humans in any realistic decision-making process.

With a fixed architecture that can be used to implement a "C"-level API as a component (using a programmer), that same architecture can be used as the basis for the component factory model. In order to make the component factory, each step of the architecture needs to be designed to facilitate automation or manually expedited. In other words, I have determined that automating/expediting the process of taking the original "C"-level API and migrating it to a Level 1 layer, and then a Level 1 to a Level 2, and then a Level 2 to a Level 3 layer, and so on, the component has been implemented automatically, or more efficiently manually. The component factory is therefore a sum of the ability to automate migrating the "C"-level API from one layer to the next within a well-defined architecture for implementing components.

Figure 2:
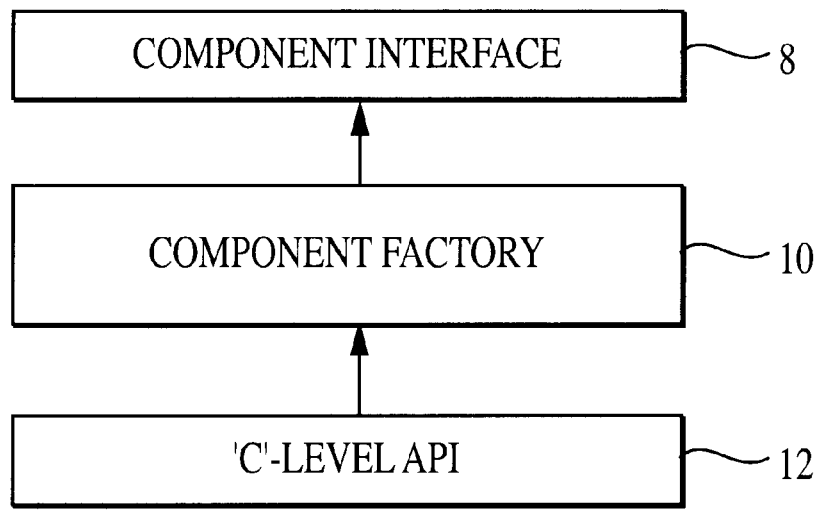
FIG. 2 is an illustration of the component factory migrating the original "C"-level API from its original state into the generic interface defined by the topmost layer.

As illustrated in FIG. 2, the component factory 10 migrates the original "C"-level API 12 from its original state into the generic interface 8 defined by the topmost layer. The first feature that can be demonstrated is that there is a topmost layer 8 that can define a component interface that can represent the features/functions of most core technologies. The component factory 10 migrates the "C"-level API 12 to the topmost level 8. Doing this in one large step would be impossible since the "C"-level API has a near-infinite variety of styles. However, the architecture advantageously has enough well-defined and well-structured layers for implementing the topmost component interface, for creating the component factory.

Figure 3:
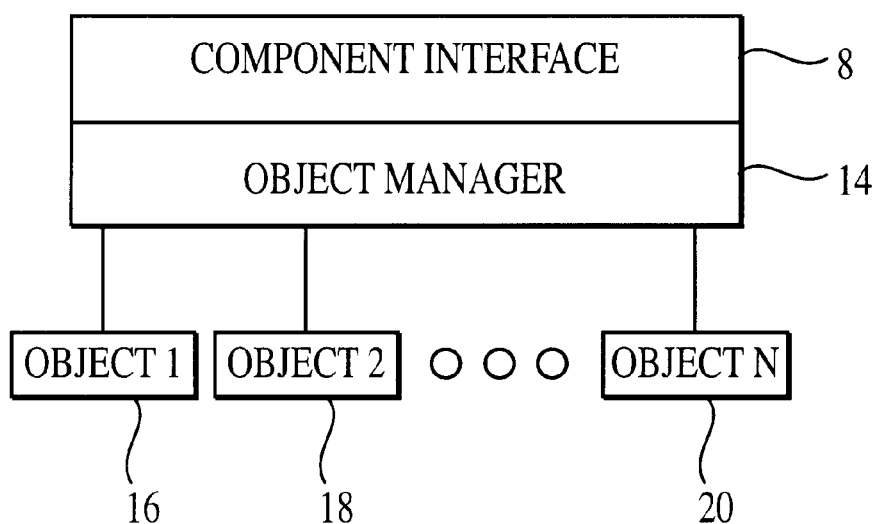
FIG. 3 is an overview of the computer architecture in the present invention.
Figure 4:
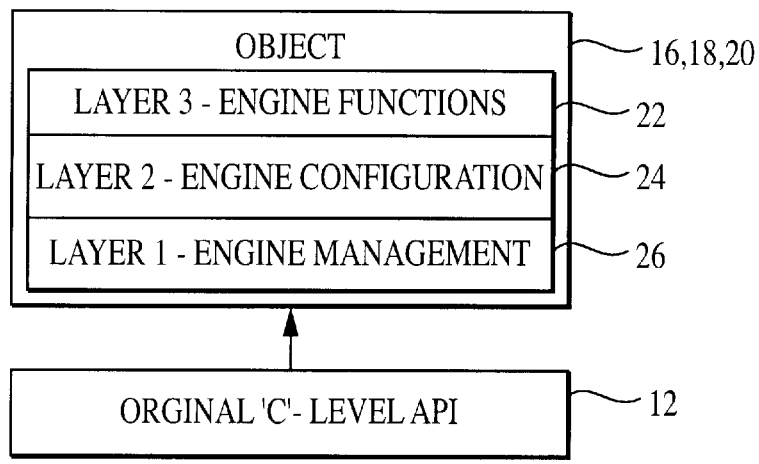
FIG. 4 is an illustration of the design of an Object in accordance with the computer architecture of the present invention.

A simplified overview of the architecture is illustrated in FIG. 3. In FIG. 3, the component interface 8 sits on top of an Object Manager 14 that communicates with individual objects e.g., 16, 18, 20. These objects 16, 18, 20 represent specific core technologies that are represented as "C"-level APIs. The design of Object1, Object2, . . . ObjectN is illustrated in FIG. 4.

A component factory can be created by automating the process of migrating the original "C"-level API 12 from its original state to the Layer 1—Engine Management tier 26, and then from the state to Layer 2 Engine configuration tier 24, and so on up the Engine Functions layer 22. These layers will be further described below.

The computer architecture is implemented, for example, as a standard COM component, as an ActiveX control; the specifications designed by Microsoft, published in the technical literature, and incorporated herein by reference. ActiveX control (COM) support is currently available within any Microsoft 32-bit Windows operating environment. ActiveX controls are supported by all OLE-based applications, including all of Microsoft's end-user products (e.g., Microsoft Office, Word, Access, Powerpoint, Access), the main Internet Browsers (Microsoft's Internet Explorer and Netscape's Navigator—the latter with an add-in product and by 4Q97 directly), most other name-brand end-user Windows products (e.g., Lotus Notes), and all major development environments (e.g., Microsoft Visual Basic and Visual C++, Delphi, Borland C++, Power Builder). By implementing the architecture as, for example, an ActiveX control, complex technologies can be programmed by virtually any Windows or Intranet user or developer. Of course, other component specifications may also be used.

Although the architecture has been implemented as a COM-based technology with C++ as the language of choice, the architecture can be implemented in many other languages (e.g. Java) and distributed architectures (e.g. CORBA).

Every engine, such as a text retrieval or an OCR (Optical Character Recognition) engine, has a unique interface. This interface is generally a "C"-level API (Application Program Interface). In most cases, the learning curve for understanding and integrating a new engine can be a one man-month to several man-years and generally requires highly experienced "C" programmers. The purpose of the architecture is to define a clear infrastructure within which any core can be rapidly "wrapped" so that users and developers can have easy access to these core technologies.

In addition to defining the infrastructure for engines to be accessible to typical users, the architecture also defines how to migrate an engine from its native state to the prescribed interface. In other words, the architecture goes beyond simply defining the framework for wrapping engines, it also defines the specific steps for wrapping these engines.

The architecture consists of a hierarchical series of layers that take any "C"-level API from its unique state to one that is standard and consistent. The result is a single, highly-integrated object component that contains and manages any type of engine that can be programmed regardless of the nature and subject of the core technology. The architecture therefore not only defines the goal (e.g., the object component interface) but also the means of implementing that goal for any type of engine.

Figure 5:
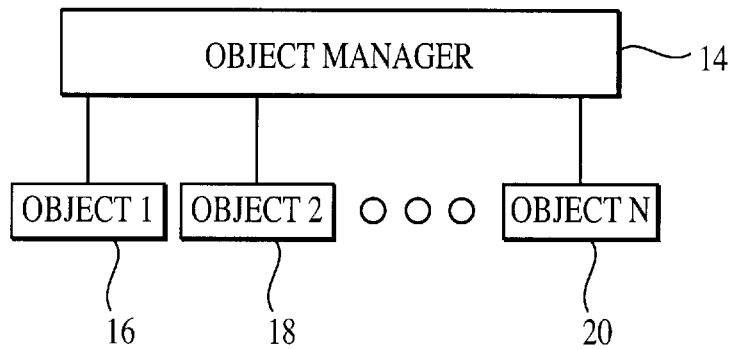
FIG. 5 is an illustration of the architecture comprised of two major parts.

The architecture is comprised of two major parts as illustrated in FIG. 5: the Object Manager 14, and the individual object components 16, 18, 20. The Object Manager 14 in FIG. 5 manages individual object components 16, 18, 20 illustrated as Object 1, Object 2, etc. The Object Manager 14 communicates with the individual object components 16, 18, 20 using a consistent COM interface.

Each object component implements the feature set of an individual engine by mapping a consistent COM interface to the "C"-Level API interface of the individual engine that it supports. In this way the Object Manager can consistently communicate with each engine, using the engine's object component. Because the COM interface of each object component is consistent, the Object Manager can interface with every underlying engine the same way.

The features of the architecture include:
1) definition of consistent COM interfaces for individual object components that represent diverse technologies;
2) a prescribed process for migrating any engine to the defined consistent COM interface; and/or
3) a predefined Object Manager that automatically manages the individual object components.

When implemented, for example, as an ActiveX control, the architecture also yields an umbrella control that can be used by a high-level programmer to program and manage numerous sophisticated technologies in a plug-and-play environment. In order to facilitate the discussion of the architecture itself it is best to start with the architecture of the engine object component and then describe the Object Manager. Since the Object Manager is directly dependent on the engine object components, an understanding of the latter will assist in the description of the former.

Engine Object Component—16, 18, 20

The purpose of the engine object is to wrap a specific engine using a series of layers that convert the engine's unique interface into a COM interface that is, for example, specified by the architecture. The architecture not only defines the consistent COM interface for implementing an engine, it also describes how to implement the interface from the original "C"-Level API. Once the COM interface of the engine object component is implemented, the Object Manager understands and can therefore communicate with it.

Figure 6:
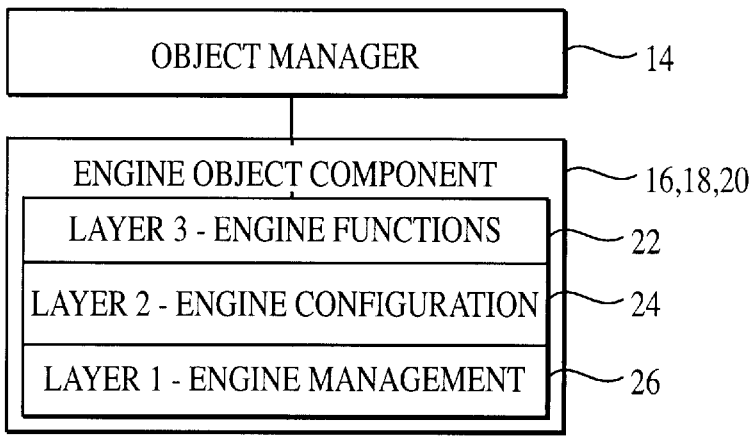
FIG. 6 is an illustration of the architecture of an engine component including, for example, three layers designed to migrate the original API of the engine to a consistent COM interface.

Each engine component consists of, for example, three layers that are designed to migrate the original API of the engine to a consistent COM interface. As illustrated in FIG. 6, the Object Manager 14 communicates with the topmost layer 22 of the object component 16, 18, 20 which is the defined interface of object component.

Each layer is described below in two parts. The first part is the prescribed COM interface for communicating with the engine object component. The second part describes a specific path for automating building the layer. By providing an outline for automating building each layer, the overall engine object component can be automatically, substantially automatically or manually expedited and generated.

Layer 1—Engine Management 26

The first layer in the object component architecture is designed to deal with the fundamental features of an engine. This includes the ability to load and unload the standard or commercially available via, for example, MicroSoft Corporation, engine Dynamic Link Libraries (DLLs) into memory, as well as the ability to consistently deal with errors. This is the most fundamental layer because it is the essential "wrapper" layer of an engine. Once this layer is complete all interaction with the underlying engine is filtered through this layer. Additional important engine management functions include dynamically accessing a function call of an engine, and initializing engine settings. All of these engine management functions are optionally and beneficially table driven to promote or facilitate access to, and implementation of, engine management functions.

The Layer 1 specification is summarized in FIG. 7 that describes the IEngineManagement COM interface. The purpose of the IEngineManagement interface is to transparently load and unload an engine to and from memory. I have determined that this is often the core feature that is incorrectly implemented and a cause for hard-to-find bugs. This layer may be generated manually by a developer who is familiar with the architecture as outlined herein in an expedited manner or automatically as described below in detail.

Layer 1 can be precisely defined in generic terms, and is therefore the simplest layer to likely be automatically, substantially automatically, or easily manually generated. A sample or example of actual code that can be used to implement this layer is described below. As long the process and/or code for implementing Layer 1 can be generically defined, that is engine and technology independent, then the process of generating the generic code for each new engine is expedited either manually or automatically.

The premise for automating any level is to start with as few pieces of information as possible. For the Engine Management layer I have assumed that nothing more than the set of DLLs that implement the engine functionality are known. Given this information, I have determined that I will need to implement:

Loading and unloading the engine from memory

Adding error management

We can start, in this example, with a model C++ header file that defines the Engine Management layer and investigate how this code can be implemented generically. As mentioned earlier, if the code to implement this layer can be defined generically then it can be easily generated, for example, manually, and/or automatically for any engine.

```
class SomeEngineObject
{
    //Wrapper Functions
private:
    FARPROC_SomeFunction;
    BOOL SomeFunction();
    //EngineManagement
protected:
    BOOL GetProcAddress (HINSTANCE, FARPROC&, LPCTSTR);
    BOOL GetProcAddresses();
    BOOL ProcessError();
public:
    BOOL ActivateEngine (BOOL Activate);
    BOOL IsEngineActivated();
};
```

The IEngineManagement interface is implemented in the C++ class as the public methods: ActivateEngine( ) and IsEngineActivated( ).

The first step of implementing the Engine Management layer 20 is to wrap each original engine function within a class-defined function that represents the original. For example, if there is an original function called Somefunction( ), then the engine object should have a corresponding Somefunction( ) method. The engine object version can then add standard engine and error management code so that any layers above have automatic error detection, correction, and reporting.

An example of generic code that maps an original function call to the original function is as follows:

```
BOOL GetProcAddress (HINSTANCE hLib, FARPROC&Proc,
LPCTSTR ProcName)
{
    Proc=::GetProcAddress (hLib, ProcName)
    if (!Proc)
    {
        SetIMAGmEError (LOADENGINEFUNCTIONSERROR,
ProcName);
        return FALSE;
    }
    return TRUE;
}
```

Given the original function name, the GetProcAddress can map the original function to one that is defined by the engine object. Using the engine object C++ header file described above, the Somefunction( ) method is mapped to the original engine function using the following line of code:

(GetProcAddress(hLib, SomeFunction, "SomeFunction" );

To map all the function calls within the original engine DLLs just requires cycling through each function call and mapping it to the engine object counterpart. Since Windows contains facilities that enables access to all the functions within a DLL, a simple loop may be used. The hLib module is derived from the DLL name, which, as mentioned at the start, is the one piece of information we are given.

What is more complex is to define a generic implementation of the engine object version of the original function. This may be described in code as follows:

```
BOOL SomeFunction (arguments)
ASSERT (arguments)
ErrorVariable=_SomeFunction (arguments);
returnProcessError();
}
```

The engine object version of the original function passes the function call to the original one after completing a series of assertion tests, and is followed by a series of error detection tests. In this way the original engine function is "wrapped" by the engine object to manage error detection and correction.

The process of loading an engine can likewise be implemented generically.

```
BOOLLoadDLLs()
{
    BOOLbReturn=TRUE;
    HINSTANCEt_hLib;
    CStringt_ModuleName;
    POSITIONpos;
    pos=m_Modules · GetStartPosition();
    if (pos=NULL)
    {
        SetIMAGinEError (NOMODULESDEFINED);
        return FALSE;
    }
    while (pos&&bReturn)
    {
        m_Modules · GetNextAssoc (pos, t ModuleName, t hLib);
        if (t_hLib!=NULL)
            continue;
        t_hLib=::LoadLibrary (t_ModuleName);
        if (t_hLib=NULL)
        {
            SetIMAGinEError (CANTLOADMODULE,
            t_ModuleName);
            FreeDLLs();
            bReturn=FALSE;
            break;
        }
        m_Modules · SetAt (t_ModuleName, t_hLib);
    }
    returnbReturn;
}
```

The LoadDLLs function is a generic implementation of a function that loops through the names of DLLs that are provided (in the form of the m_Modules variable), and cycles through each one loading it into memory using the Windows LoadLibrary( ) function. A similar engine object function can be implemented to remove these DLLs from memory.

Figure 8:
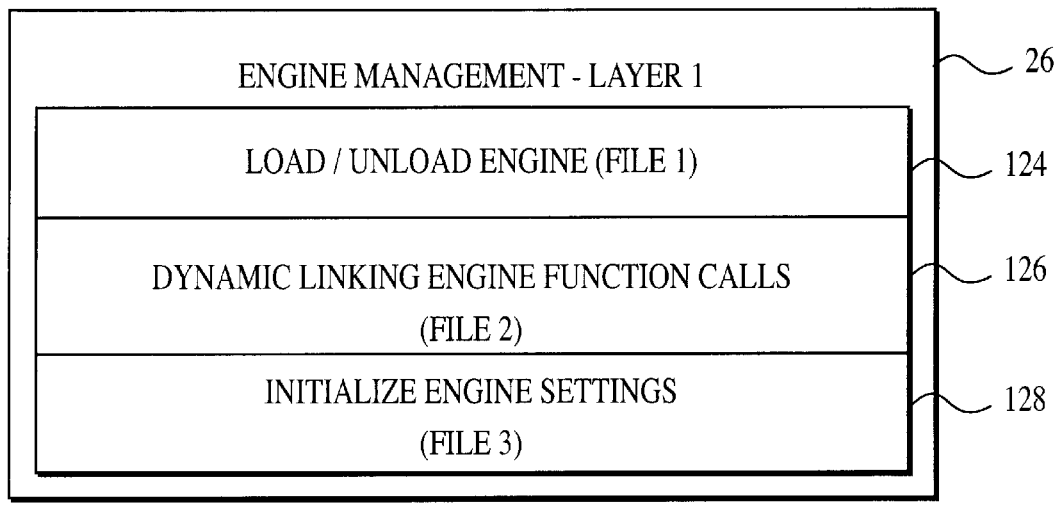
FIG. 8 is an illustration of the engine management layer being divided into three functions/specifications.

The present invention further divides the engine management layer into three functions, as illustrated in FIG. 8. The first function is loading and unloading 124 of the core or engine technology. The second function for the engine management layer 26 is dynamically linking procedures or function calls, or hooking the desired engine functionality into the procedures of the core technology 126, including, for example, initializing and setting up engine settings. The third function is initializing the engine itself 128, which is essentially engine management. Once these three functions are performed in level 1, anything in the core technology is accessible.

Advantageously, the present invention utilizes tables to drive each of these three functions described above, and as illustrated in FIG. 9. Each of the tables of files, for example tables 130, 136, 140, are filled in with the appropriate data or information. I have discovered that if the above three functions are set up or implemented using tables, that the core technology may be effectively and efficiently described. That is, the use of tables is a very effective and simple method of describing an engine for use in engine management, engine loading/unloading and engine procedure linking. For example, it is similar to indicating or providing the raw data of that engine, the list of the engine functions, and the list of the engine dynamic link libraries (DLLs) for engine management.

The files or tables contain the logic or executable of the engine. Accordingly, all that is needed is a list of the engine functions 132, a list of the file of the engine executable code or DLLs 138, and a list of the engine settings 142. Using the tables with the above information, the engine may be automatically loaded and unloaded, initialized, and/or dynamically hooked into the necessary functions. Accordingly, the process of generating level 1 for engine management may advantageously be automated. The specific algorithms used for the engine management layer are described in Appendix A.

In summary, for the Engine Management layer the following pieces may be automated, substantially automated, and/or manually expedited.

Loading and unloading the engine DLLs (provided into and out of memory

Mapping original functions to engine object counterparts

Adding general error detection and correction

Determining and matching arguments and return values for mapping the original functions to their engine object counterparts. In order to add assertion and error detection and correction, the original function must be wrapped and called from within the engine object version of the original function.

Managing error feedback. All APIs have their own way of providing error feedback. Since one of the goals of the Engine Management layer is to generically manage error detection, correction, and feedback, it must handle all errors identically. However, APIs have numerous and incompatible methods in this case. I have determined that most APIs follow one of several distinct mechanisms for providing error feedback. By creating specific classes of APIs, the process of generating Layer 1 engine management may be expedited, manually and/or automatically.

Layer 2—Engine Configuration 24

The second layer 24 in the object component architecture is designed to deal with configuring an engine. This includes the ability to set any variety of features that are generally associated with the functioning of an engine. The architecture is designed to meet the challenge of providing a uniform interface for dealing with generally any or most engine settings.

The engine configuration layer 24 includes a series of prefabricated functions that map out the settings stored in the table to the appropriate engine configuration parameters. Accordingly, all that is needed is to fill in the values for the table associated with engine configuration. Thus, the engine object may advantageously come pre-packaged with predetermined tables populated with predetermined values.

The Layer 2 specification can be summarized in FIG. 10 that describes an exemplary IEngineConfiguration COM interface. The purpose of the IEngineConfiguration interface is to provide the ability to set and get the settings of any engine uniformly. While the Engine Management layer can load and unload engines transparently, this layer configures engines to operate as required by the user or developer.

Figure 11:
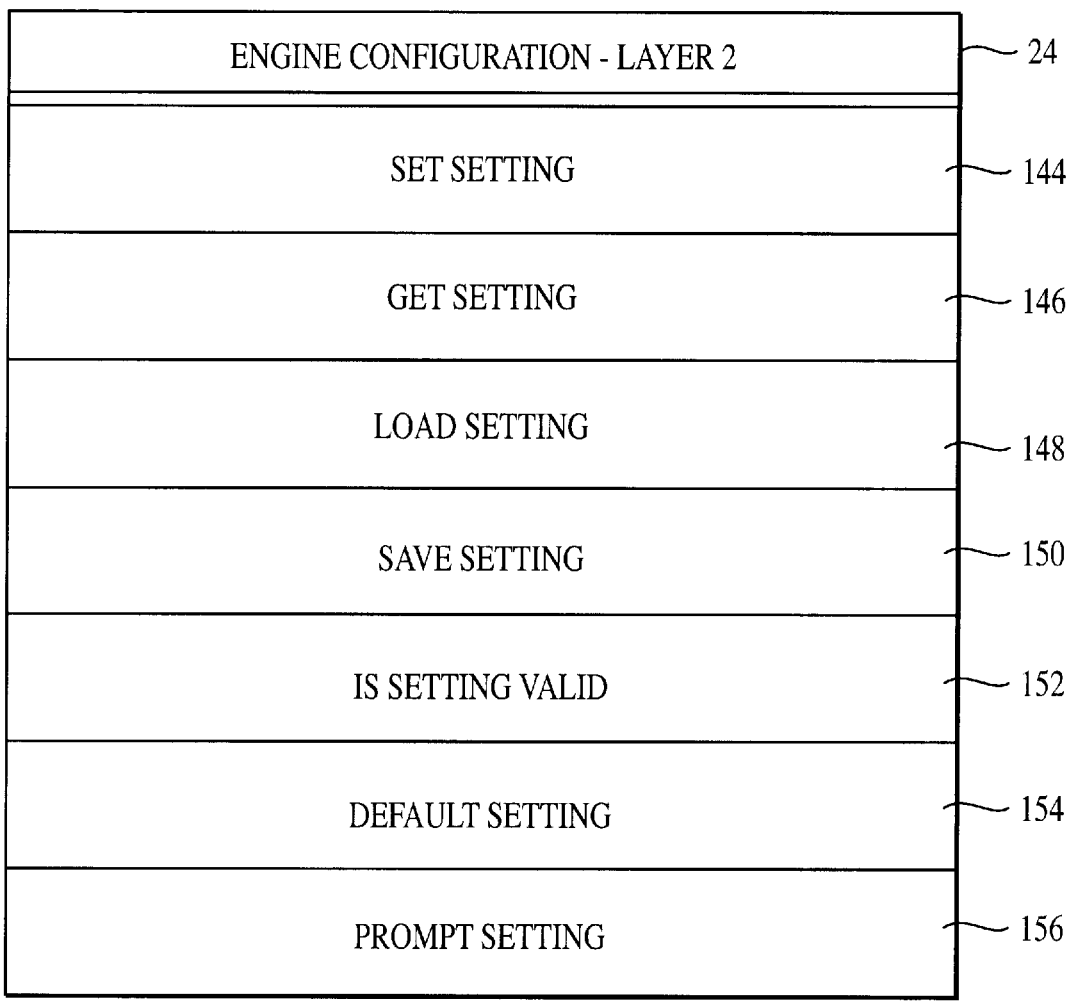
FIG. 11 is another exemplary table illustrating the engine configuration specification.

FIG. 11 is another exemplary table illustrating the engine configuration specification. Examples include a set setting function 144, a get setting function 146, a load setting 148, a save setting 150, an is setting valid function 152, a default setting 154, and a prompt setting 156.

The get setting 146 and set setting 144 functions retrieve the value of a particular engine setting, or assign a value to a particular engine setting, respectively. Each one of the get setting and set setting functions includes or comprises a table of the settings. The load setting 148 and save setting 150 functions do the similar function as the get setting and set setting functions, but in persistence. Persistence is defined as writing values to the disk, for example hard disk, compact disk, and the like, and retrieves the values from the disk. So as where the get setting and set setting functions assign a value and/or retrieves the value from local memory, the load and set setting functions assign the value and retrieve the value of the setting from disk. The load and set setting functions provide persistence when the computer system is close down, such that when the computer system will return to the last setting when it is subsequently reopened.

The default setting function 154 provides the most favorable value for a given setting. Thus, if no setting is selected, the system will automatically select default settings. The prompt setting function 156 is what displays to the user all the various settings. The specific algorithms used to implement the engine configuration layer are included in Appendix B.

Advantageously, the present invention generates the skeletal structure of each table automatically. In addition, since there is a table of settings, the skeletal structure not only generates these functions, but also fills in the settings that need to be assigned. Thus, the engine configuration function provides the feature of having a pre-populated set of options which require particular values to be assigned to table entries.

Although this architecture advantageously makes it simple for a human to migrate the configuration of an engine appear into two simple and universally applicable interface points, doing so automatically requires additional steps. The two steps to automating this approach are, for example, as follows:

Determine the configuration methods used by various APIs for configuring the core technology;

Detect the variations for configuring an engine and automating each one separately.

As with Layer 1—Engine Management, there exists a finite set of general variations used by developers of core technologies to configure an engine. Although Layer 1 is clearly more generic in nature, advantageously, Layer 2 also has considerable consistency.

Layer 3—Engine Functionality 22

The third layer 22 in the object component architecture is designed to deal with accessing the actual functionality of the core engine. For example, for an OCR engine this would be to OCR an image or a document. For a text retrieval engine this would be to initiate and retrieve results of a text search.

An exemplary Layer 3 specification can be summarized in FIG. 12 that describes the IEngineFunction COM interface. The purpose of the IEngineFunction interface is to provide the ability to initiate any function supported by an engine. The simple IEngineFunction interface is capable of managing an infinite variation of functions.

The third layer may advantageously be further divided into many sub-layers that more discretely define the steps necessary to execute a function within an API. Since the designer of an API has infinite variety of possible ways of implementing a function, creating a tiered architecture to manage this layer is useful.

Figure 13:
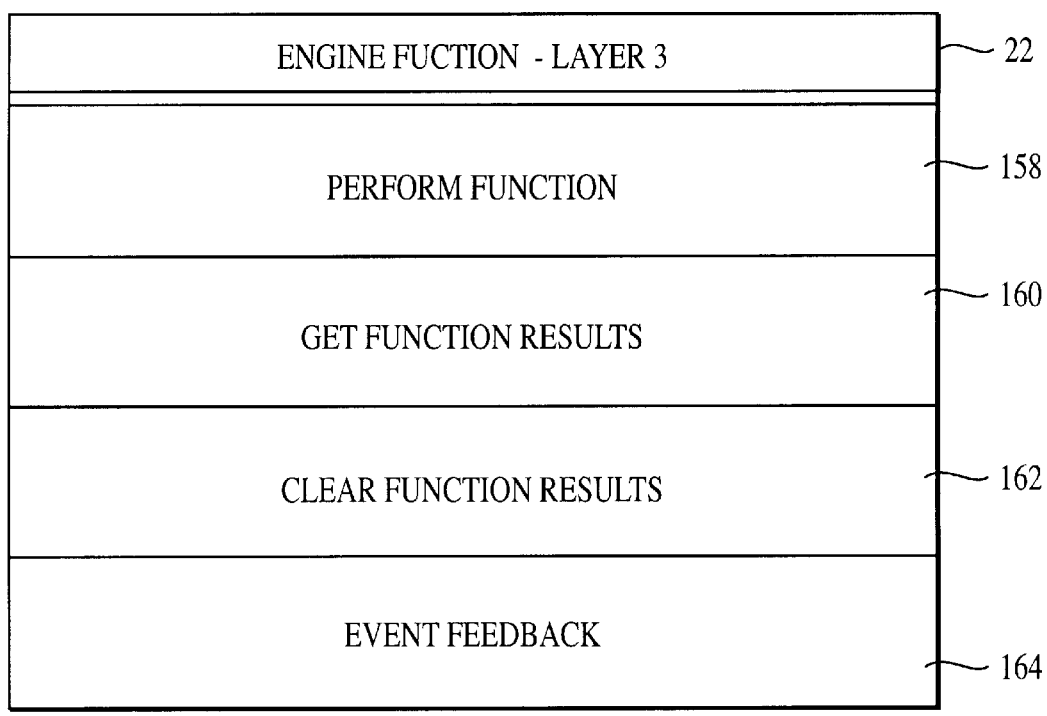
FIG. 13 is another exemplary table illustrating the engine functionality specification.

An exemplary tiered architecture for the engine function is illustrated in FIG. 13. As illustrated in FIG. 13, the engine function or engine processing layer includes four elements. The engine function layer 22 includes a series of predefined functions to perform in the perform element 158. For example, for optical character recognition (OCR), the present invention uses a set of predefined functions. Alternatively, for scanning, the present invention includes a separate set of predefined functions.

Accordingly, there are a series of actions that are performed by the engine function layer on a given engine, such as an OCR engine, a scanning engine, a printing engine and the like. The engine function layer is designed not to generally go directly to a specific engine. Rather, the engine function layer 22 will generally interface with the engine management layer 26 and/or the engine configuration layer 24 as needed.

For example, in the course of performing an action and/or function, the engine function layer interfaces with the engine configuration layer to possibly modify settings. For an OCR engine, the engine function layer fills out a table of OCR documents as one action that could take place. OCR image is another action.

The get function results 160 gets the results of the function stored in a register. The clear function 162 clears all the registers that contain all the results, in this case its memory. The feedback event or function 164 provides continuous feedback, depending on what action takes place. For example, if an OCR action is being performed, the feedback function provides the percentage of completion of the OCR process. The specific algorithms used to implement the engine function layer are included in Appendix C.

The automation of this layer is accomplished by the following functions:

Determine the execution of methods used by various APIs for executing a given function;

Divide this layer into a multi-tiered layer that further facilitates automation;

Detect the variations of the sub-layers and automate each one separately.

Although this layer has many more variations than Layer 2, I have determined that there is a general set of variations used by developers of APIs to implement core functionality.

Thus, the benefit of the component factory is that it can transform core software technologies that are currently available in "C"-level APIs to a limited audience into components that have a much greater audience.

There are a variety of "C"-level APIs that cover the following categories of functionality that can be better served in the market as ActiveX controls or other component and used in conjunction with the architecture and methods described herein.

Text Retrieval

Data Extraction

Workflow

Storage Management

Each of these categories has several vendors with products that currently service the market in a limited way because the technologies are only available as "C"-level APIs. Without the core competency of creating components out of these core technologies they are limiting their marketability and opportunity for international distribution.

With the proposed component factory users and vendors can rapidly create components from their original core technology and increase their marketability, competitiveness, and ultimately their sales.

Further, there are numerous core technologies, such as text-retrieval and ICR (Intelligent Character Recognition), that have already been implemented, and are only available as "C"-level APIs. Many, if not most, core technologies are first released exclusively as "C"-level APIs. While there are integrators and corporations who have the team of technologists who can integrate these "C"-level APIs in-house, most companies are looking for component versions that can be implemented at a much higher level. Therefore, many of the core technologies that are only available in a "C"-level API are not being used due to their inaccessible interface. The benefit of the component factory is that it can rapidly make available core technologies implemented as "C" APIs that would otherwise be underutilized or dormant in research labs by converting them to high-level components that can be used by millions of power-PC users.

With the advent of the World Wide Web (WEB) this opportunity has increased exponentially. The WEB is now home to a vast number of WEB authors with minimal formal training who can implement HTML pages and build web sites. One of the fundamental technologies for extending the capability of the WEB from simple page viewing to interactive and sophisticated applications is components. A component extends the capability of HTML by enabling a WEB author to add core technology as a pre-packaged technology. Since components are fundamental to the growth and usability of the WEB, having a component factor that can translate "C"-level toolkits into components that are then usable within WEB sites opens a vast and new worldwide market to these technologies.

Figure 14:
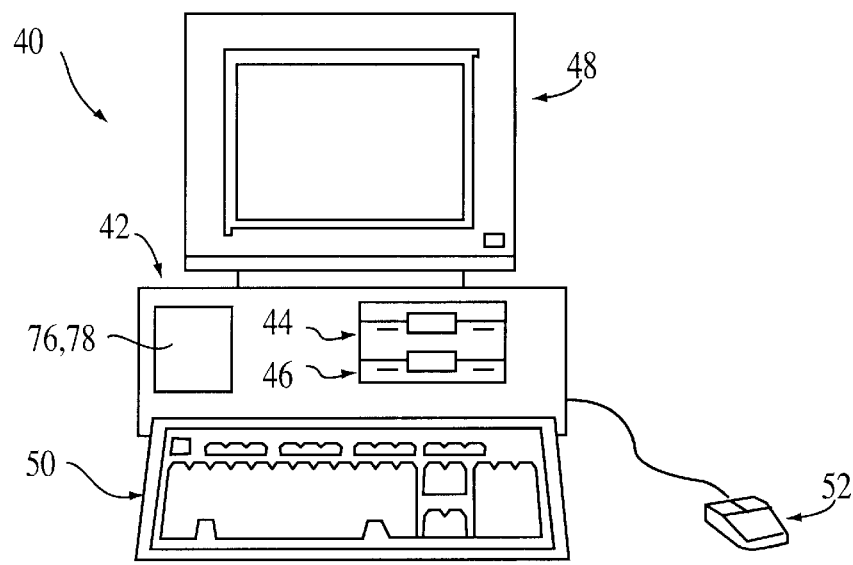
FIG. 14 is an illustration of a main central processing unit for implementing the computer processing in accordance with a computer implemented embodiment of the present invention.

FIG. 14 is an illustration of a main central processing unit for implementing the computer processing in accordance with a computer implemented embodiment of the present invention. The procedures described above may be presented in terms of program procedures executed on, for example, a computer or network of computers.

Viewed externally in FIG. 14, a computer system designated by reference numeral 40 has a central processing unit 42 having disk drives 44 and 46. Disk drive indications 44 and 46 are merely symbolic of a number of disk drives which might be accommodated by the computer system. Typically these would include a floppy disk drive such as 44, a hard disk drive (not shown externally) and a CD ROM indicated by slot 46. The number and type of drives varies, typically with different computer configurations. Disk drives 44 and 46 are in fact optional, and for space considerations, may easily be omitted from the computer system used in conjunction with the production process/apparatus described herein.

The computer also has an optional display 48 upon which information is displayed. In some situations, a keyboard 50 and a mouse 52 may be provided as input devices to interface with the central processing unit 42. Then again, for enhanced portability, the keyboard 50 may be either a limited function keyboard or omitted in its entirety. In addition, mouse 52 may be a touch pad control device, or a track ball device, or even omitted in its entirety as well. In addition, the computer system also optionally includes at least one infrared transmitter 76 and/or infrared receiver 78 for either transmitting and/or receiving infrared signals, as described below.

Figure 15:
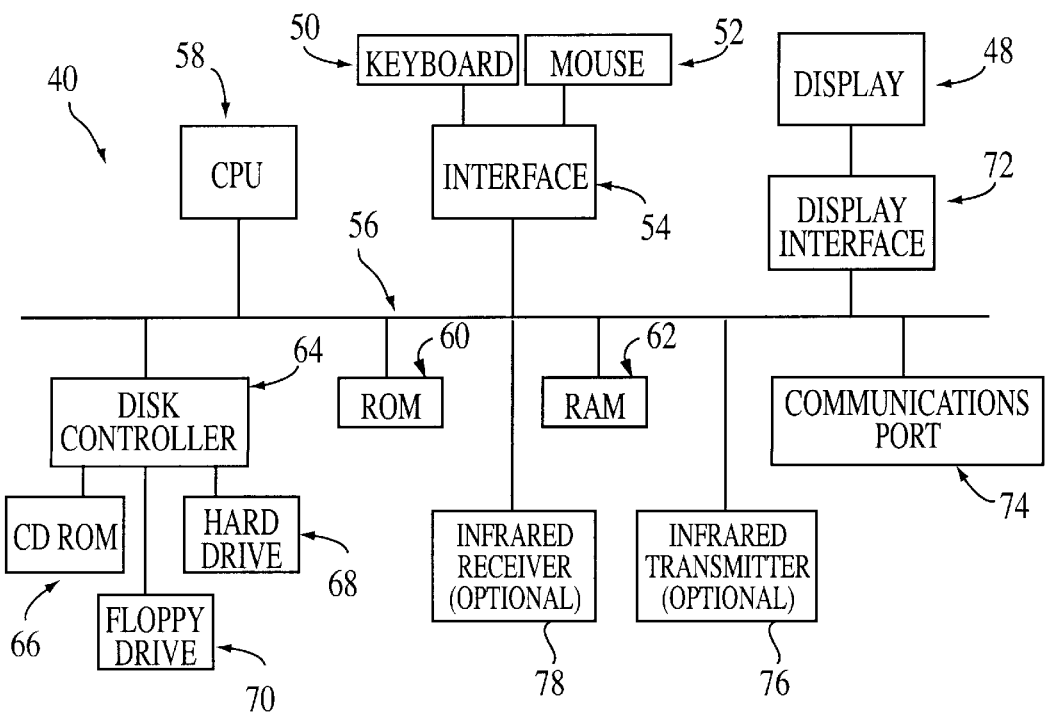
FIG. 15 illustrates a block diagram of the internal hardware of the computer of FIG. 14.

FIG. 15 illustrates a block diagram of the internal hardware of the computer of FIG. 14. A bus 56 serves as the main information highway interconnecting the other components of the computer. CPU 58 is the central processing unit of the system, performing calculations and logic operations required to execute a program. Read only memory (ROM) 60 and random access memory (RAM) 62 constitute the main memory of the computer. Disk controller 64 interfaces one or more disk drives to the system bus 56. These disk drives may be floppy disk drives such as 70, or CD ROM or DVD (digital video disks) drive such as 66, or internal or external hard drives 68. As indicated previously, these various disk drives and disk controllers are optional devices.

A display interface 72 interfaces display 48 and permits information from the bus 56 to be displayed on the display 48. Again as indicated, display 48 is also an optional accessory. For example, display 48 could be substituted or omitted. Communication with external devices, for example, the components of the apparatus described herein, occurs utilizing communication port 74. For example, optical fibers and/or electrical cables and/or conductors and/or optical communication (e.g., infrared, and the like) and/or wireless communication (e.g., radio frequency (RF), and the like) can be used as the transport medium between the external devices and communication port 74.

In addition to the standard components of the computer, the computer also optionally includes at least one of infrared transmitter 76 or infrared receiver 78. Infrared transmitter 76 is utilized when the computer system is used in conjunction with one or more of the processing components/stations that transmits/receives data via infrared signal transmission.

Figure 16:
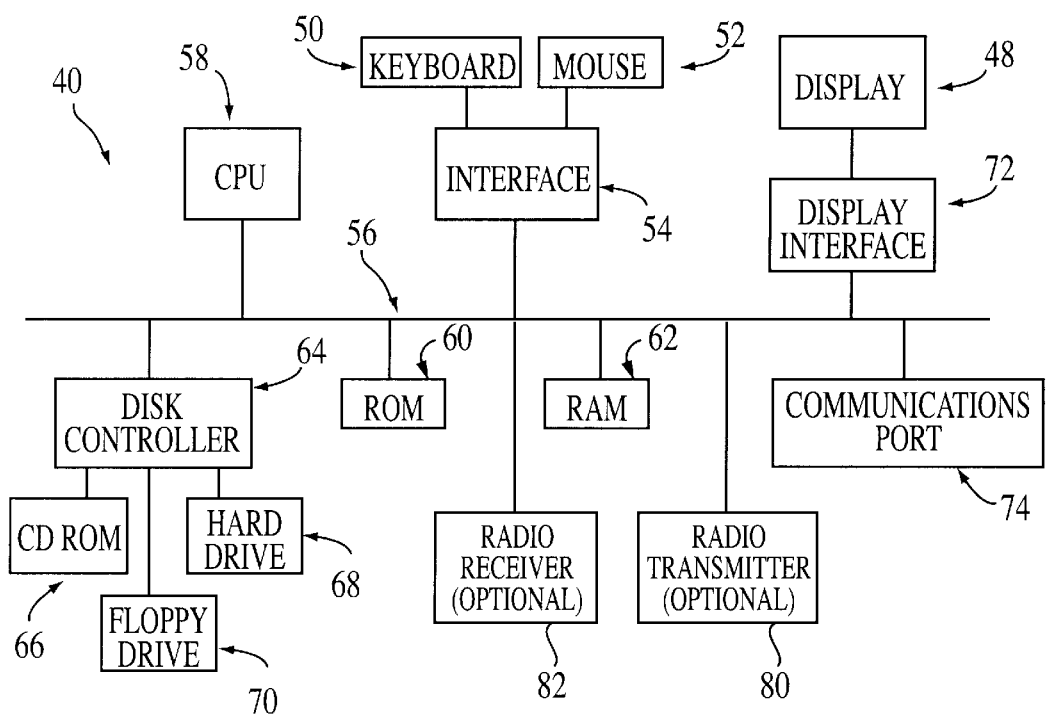
FIG. 16 is a block diagram of the internal hardware of the computer of FIG. 15 in accordance with a second embodiment.

FIG. 16 is a block diagram of the internal hardware of the computer of FIG. 14 in accordance with a second embodiment. In FIG. 16, instead of utilizing an infrared transmitter or infrared receiver, the computer system uses at least one of a low power radio transmitter 80 and/or a low power radio receiver 82. The low power radio transmitter 80 transmits the signal for reception by components of the production process, and receives signals from the components via the low power radio receiver 82. The low power radio transmitter and/or receiver 80, 82 are standard devices in industry.

Figure 17:
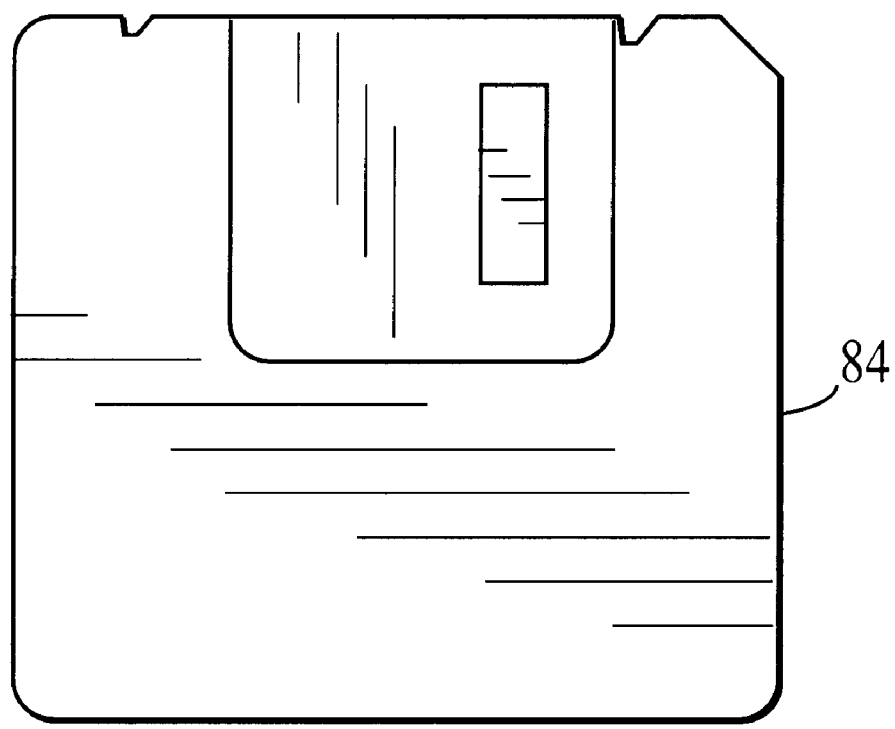
FIG. 17 is an illustration of an exemplary memory medium which can be used with disk drives illustrated in FIGS. 14–16.

FIG. 17 is an illustration of an exemplary memory medium which can be used with disk drives illustrated in FIGS. 14–16. Typically, memory media such as floppy disks, or a CD ROM, or a digital video disk will contain, for example, a multi-byte locale for a single byte language and the program information for controlling the computer to enable the computer to perform the functions described herein. Alternatively, ROM 60 and/or RAM 62 illustrated in FIGS. 15–16 can also be used to store the program information that is used to instruct the central processing unit 58 to perform the operations associated with the production process.

Although processing system 40 is illustrated having a single processor, a single hard disk drive and a single local memory, processing system 40 may suitably be equipped with any multitude or combination of processors or storage devices. Processing system 40 may, in point of fact, be replaced by, or combined with, any suitable processing system operative in accordance with the principles of the present invention, including sophisticated calculators, and hand-held, laptop/notebook, mini, mainframe and super computers, as well as processing system network combinations of the same.

Conventional processing system architecture is more fully discussed in *Computer Organization and Architecture,* by William Stallings, MacMillam Publishing Co. (3rd ed. 1993); conventional processing system network design is more fully discussed in *Data Network Design,* by Darren L. Spohn, McGraw-Hill, Inc. (1993), and conventional data communications is more fully discussed in *Data Communications Principles,* by R. D. Gitlin, J. F. Hayes and S. B. Weinstain, Plenum Press (1992) and in *The Irwin Handbook of Telecommunications,* by James Harry Green, Irwin Professional Publishing (2nd ed. 1992). Each of the foregoing publications is incorporated herein by reference. Alternatively, the hardware configuration may be arranged according to the multiple instruction multiple data (MIMD) multiprocessor format for additional computing efficiency. The details of this form of computer architecture are disclosed in greater detail in, for example, U.S. Pat. No. 5,163,131; Boxer, A., Where Buses Cannot Go, IEEE Spectrum, February 1995, pp. 41–45; and Barroso, L. A. et al., RPM: A Rapid Prototyping Engine for Multiprocessor Systems, IEEE Computer February 1995, pp. 26–34, all of which are incorporated herein by reference.

In alternate preferred embodiments, the above-identified processor, and in particular microprocessing circuit 58, may be replaced by or combined with any other suitable processing circuits, including programmable logic devices, such as PALs (programmable array logic) and PLAs (programmable logic arrays). DSPs (digital signal processors), FPGAs (field programmable gate arrays), ASICs (application specific integrated circuits), VLSIs (very large scale integrated circuits) or the like.

Figure 18:
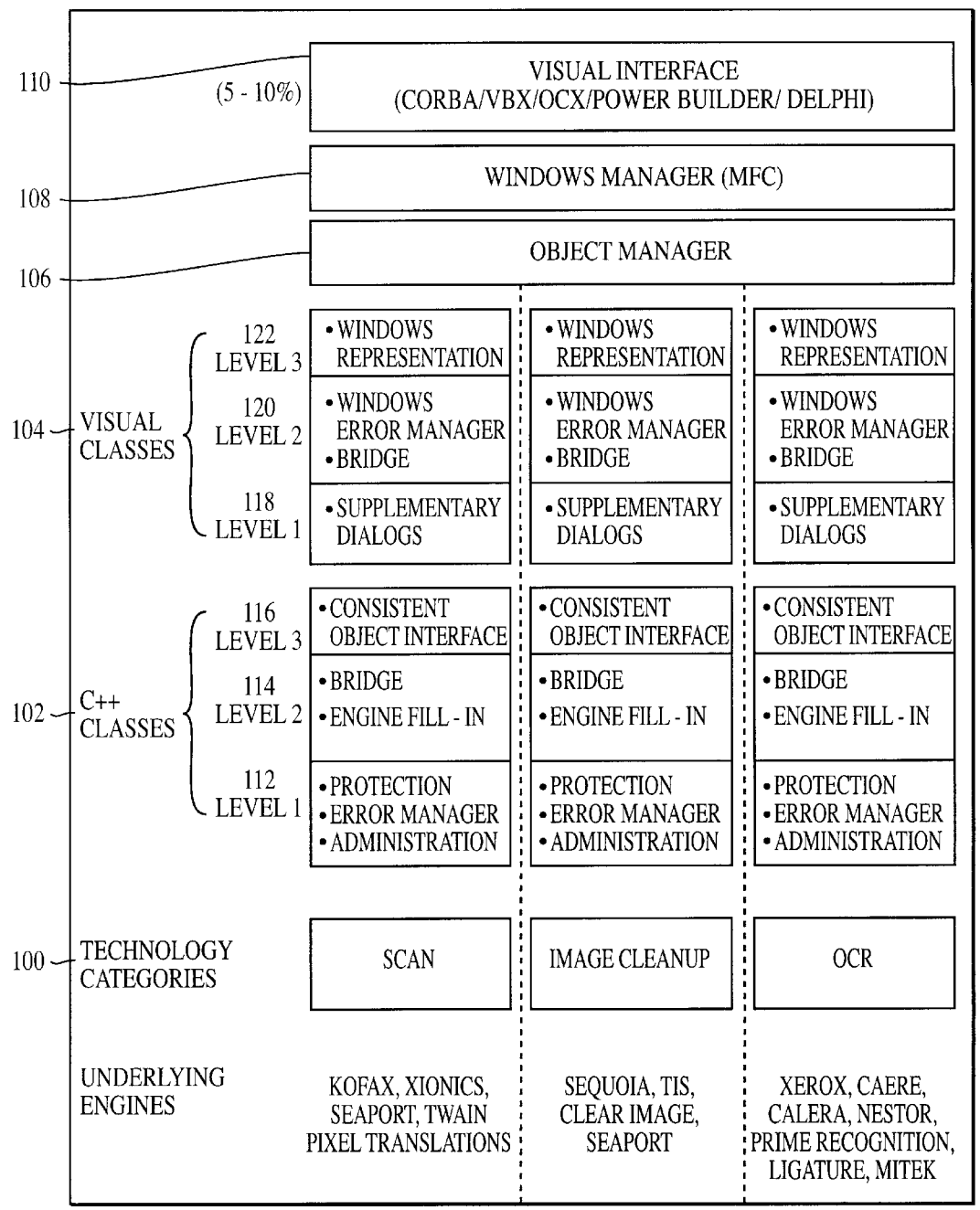
FIG. 18 is an illustration of another embodiment of the component factory migrating the original "C"-level API from its original state into the generic interface defined by the topmost layer.

FIG. 18 is an illustration of another embodiment of the component factory migrating the original "C"-level API from its original state into the generic interface defined by the topmost layer. This powerful architecture goal is to supply easy access to all imaging functions that can be performed by any engine.

The architecture according to this second embodiment, groups C-level toolkits 100 into logical categories, such as scan, print, display, OCR, cleanup and so on. A single engine can span multiple categories (e.g., Kofax engine does view/print/scan). This enables the architecture to deal with the multitude of engines available in a logical fashion.

On top of these, a three-level C++ class (or object) 102 is built for each engine. This object gives uniform access to the engine and to all its unique settings. The three levels do the following:

Level 1 of the C++ classes 112 is a protective wrapper for each function call in the underlying engine. It traps all errors and provides error management and administration to prevent accidental GPFs or engine crashes.

Think of it as the "condom layer." While providing the most direct access feasible to the underlying engine and all its capabilities, level 1 of the C++ class 112 also protects the user from the engine. It manages all engine loading and unloading, prevents multiple copies of an engine and calls engines automatically as needed.

The architecture also provides three levels of access: 1. Use the default engine settings. Benefit: No learning up front. Program knowing nothing other than "OCR gets text out of there." 2. Prepackage customized engine settings. Set it once for everyone who uses the program, every time they use the program. 3. Modify engine settings at run-time. Let the user choose the settings.

Level 2 of the C++ classes 114 bridges the low-level API calls so they can be used by level 3 116 in standardized calls for each category. And it supplements the engine by providing additional functionality, such as safely loading and unloading engines.

Level 3 of the C++ class 116 consists of a standardized set of calls for all engines in each category. Programmers can access all the unique functions of each engine in a uniform way.

Another associated C++ class, called a Visual Class 104, adds a visual interpretation of each engine. This class manages all user interaction with each underlying engine. Like their lower-level counterparts, the Visual Class consists of three layers:

Level 1—118 adds any dialogs or other pop-up window capability that may be lacking in each engine. Examples: Dialogs to customize the engine settings or, for a recognition engine, the zone definition settings.

Level 2—120 serves two functions: It bridges level 1 dialogs with the actual Windows window that represents the control. It also handles all Windows-related error message presentation.

Level 3—122 manages anything else from the underlying engine (such as annotations) that needs to appear on the window. The Visual Class includes engine-specific Windows dialog boxes that let you customize which engine features you want to use, as well as any other Windows representation necessary for a toolkit. (For example, a compression engine has to display the image—the visual class, not the engine, does the work.)

The Object Manager layer 106, the first horizontal umbrella, orchestrates the underlying objects. It translates service requests into a form that the engine objects can understand.

The Windows Manager 108 presents Windows messages (move window, mouse/scrollbar/toolbox activity) to the Object Manager. It is written using Microsoft's Foundation Class (MFC), which makes it easy to support OCXs. (The OCX is in fact an MFC class.)

At the top, a visual interface 110 presents to the user a set of visual calls and translates those calls into Windows messages. This layer comprises only 5% of the VBX code, yet it permits the toolkit to appear as a VBX, OCX or other standard visual interface.

Accordingly, the present invention provides two main layers, the engine object component layer and the object manager layer. By creating these two main layers, the present invention allows third parties to create their own engine object component layers so that the third party engine can be readily compatible and useable by the present invention. In addition, the present invention is accessible via the Internet. That is, the present invention is operable over the Internet using, for example, standard Internet protocols, such as component object module (COM) communication protocol and distributed COM (DCOM) protocol.

In addition, the present invention optionally combines three layers of functions including the visual interface, the windows manager and the object manager into one layer called the object manager. Of course, this combination of layers is not meant to convey that only these specific layers must be used, but rather, to be indicative of overall functionality generally required to implement or execute component engines. That is, one or more of the above functions may be incorporated into the object manager layer. The present invention also advantageously combines the visual classes and C++ classes into the engine object component to further standardize and/or provide access to the object manager for engine object components.

The present invention optionally uses the standard ActiveX component control supplied, for example, by MicroSoft Corporation. ActiveX is a protocol for component communication. The present invention also creates each of the object manager and the engine component layer as a separate ActiveX. That is, the object manager is its own ActiveX control, and the engine object is its own ActiveX control. Thus, the engine object can now run independently from the object manager. Accordingly, the engine object can operate without relying necessarily on the concurrent operation of the object manager.

The independent relationship between the engine object and the object manager means also that the engine object represents a discrete means of technology. For example, an engine object can be an OCR technology. This provides several benefits. First, because the object manager layer is open, the manufacturer of the OCR technology can wrap their own engine in the form of an engine object component, and the engine will automatically "plug into" or work with, the object manager. Thus, the engine object is provided high level access, making it accessible to many more parties, users, and the like. When the object manager interface is designed to be open, any third party, such as an engine manufacturer, can create their own engine object component that is compatible with the object manager, the manufacturer can do it.

Figure 19:
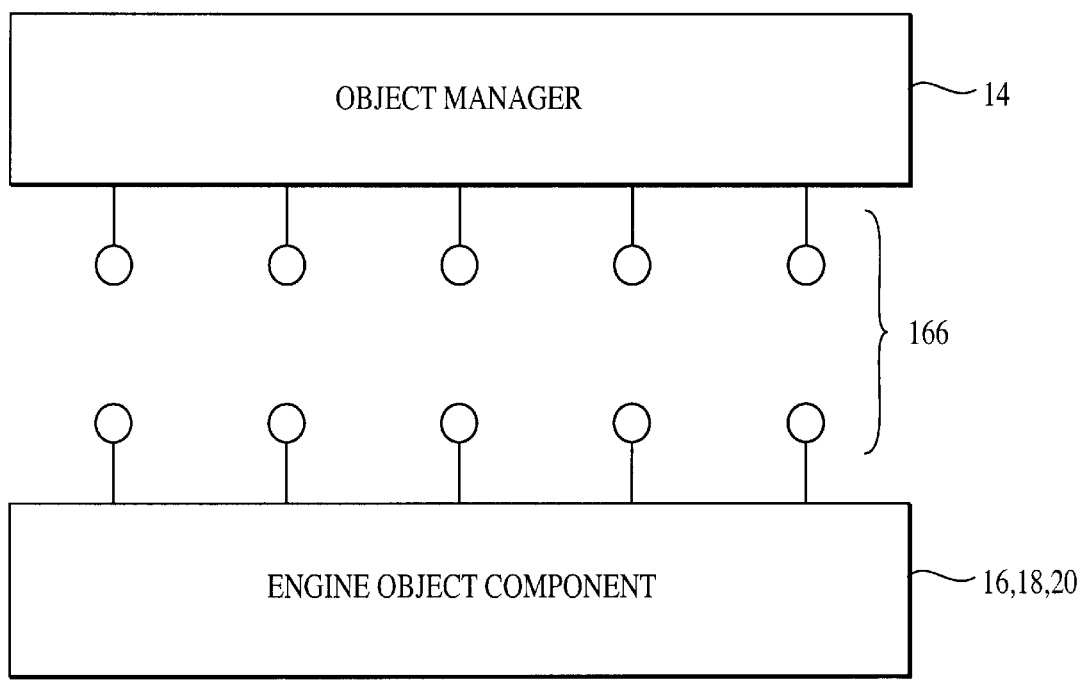
FIG. 19 is an illustration of a distributed environment or architecture for manually and/or automatically generating and/or using reusable software components for client server and/or intranet operating environments.

FIG. 19 is an illustration of a distributed environment or architecture for manually and/or automatically generating and/or using reusable software components for client server and/or intranet operating environments. A very significant point that is relevant to why the object manager and the engine object component are independent in the present invention relates to providing a distributed environment for using the present invention. Rather than communicate within the same technology between the object manager and the engine object, the object manager and the engine object component communicate with each other in binary mode, via, for example, standard distributed component object module (DCOM) communication. As illustrated in FIG. 19, object manager 14 communicates with engine object component 16, 18, 20 via DCOM specification 166. Other types of component communication may also be utilized that provide the capability of a distributed component interaction.

Thus, the engine object component and the object manager can leverage current protocols to not only communicate on the same machine, but also on different machines such as a client server and/or intranet and/or Internet environment. The object manager can be placed on one machine, and the engine object component on another machine and have distributed processing, what is otherwise called thin client processing, distributed processing, wide area intranet processing.

What this allows the present invention to do is to put the object manager on the thin client, who would accept the request from the user, for example, to OCR something or to print something. The actual request is handled or processed by the engine object component which generally resides on the server. The engine object component contains the horse power, or the processing power to process the request.

The engine object layer is generally located in the same or substantially same location as where the core technology or engine itself is being stored. Alternatively, the engine object layer and the engine may be optionally located in a distributed environment on different machines, servers, and the like.

Figure 20:
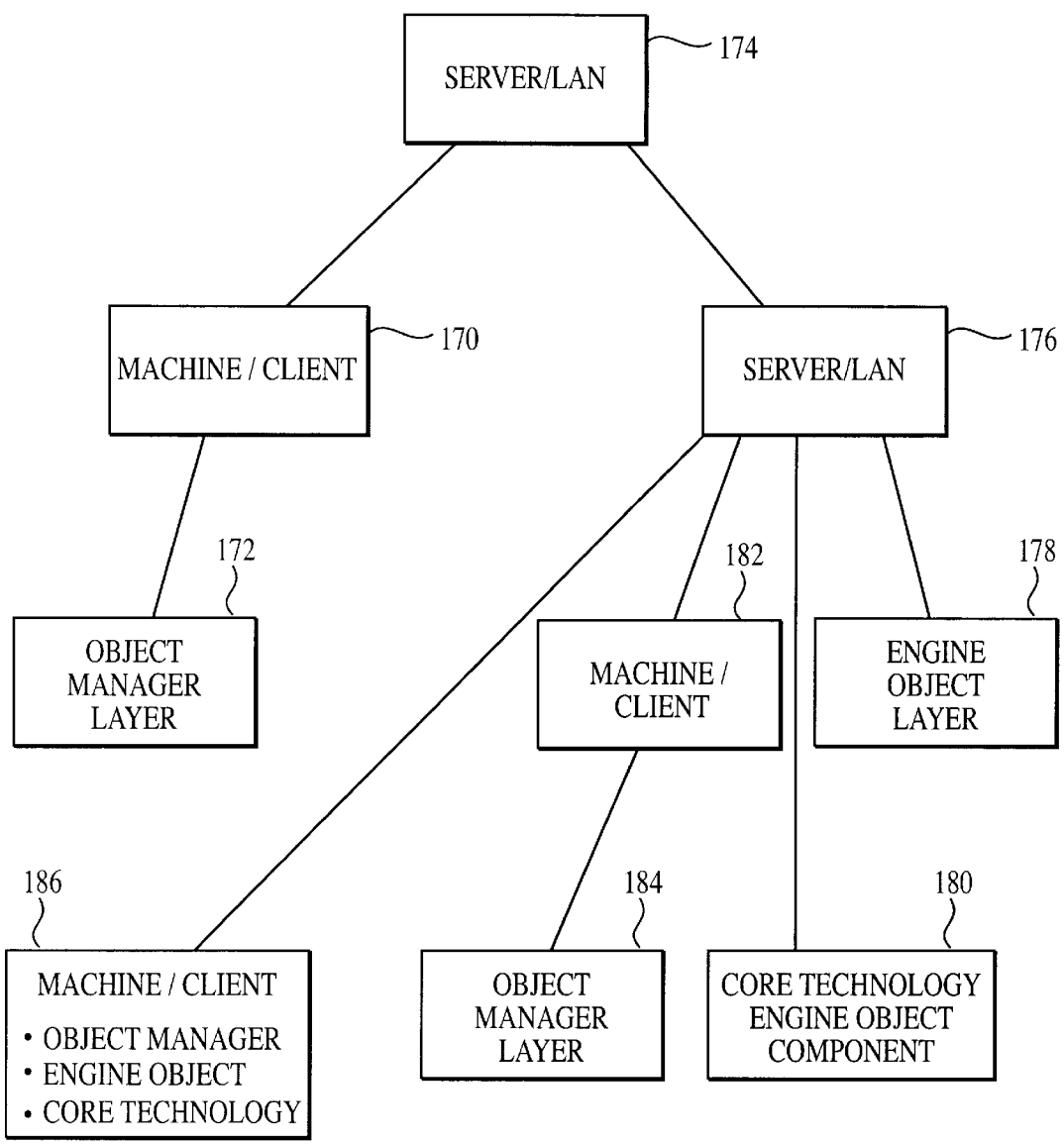
FIG. 20 is a detailed illustration of the distributed environment or architecture for manually and/or automatically generating and/or using reusable software components for client server and/or intranet operating environments.

FIG. 20 is a detailed illustration of the distributed environment or architecture for manually and/or automatically generating and/or using reusable software components for client server and/or intranet operating environments. In FIG. 20, client 170 includes object manager layer 172. Client 170 executes the core technology 180, via accessing engine object layer 178 managed/stored on server 176, and communicated via server 174.

Client 182, located on the same server 176 as core technology 180 and engine object layer 178, may also be used to execute the core technology 180 via object manager layer 184. In this instance, the client 182 with the object manager layer 184 is located on the same server 176 as the engine object layer 178. In addition, since the present invention utilizes a communication protocol between components, for example, DCOM, that allows a client to also include both the engine object component layer and the object manager layer on the same machine 186, as well as the core technology.

Further, since the object manager is formatted or constructed of a client technology, the object manager can sit in a standard browser. This means that anyone that has an Internet browser, i.e., anyone that has access to the world wide web (WEB) can actually access the core engine technology. Thus, by structuring the architecture of the present invention as described herein, users automatically become Internet, intranet and/or WEB enabled.

The present invention also transforms the core technology from essentially client based technology into a client server and/or a thin client technology. This makes the core technology high level accessible, thereby transforming any core technology into client server, or hidden client technology. The browser is located on the client, and the browser leverages the object manager. Accordingly, the browser optionally contains the object manager, and the object manager makes requests over, for example, the Internet, local network, and the like via a server, to the engine object. The server would be either a web server or a LAN server.

The present invention also advantageously provides the ability to have the client and the server, in a distributed environment as discussed above, or on the same machine locally. The present invention utilizes the DCOM communication protocol defining the communication protocol between the object manager and the engine object component. Accordingly, since DCOM can work on the same machine as well as in a distributed environment, DCOM does not necessitate that the engine object or the object manager component be on two separate machines.

Figure 21:
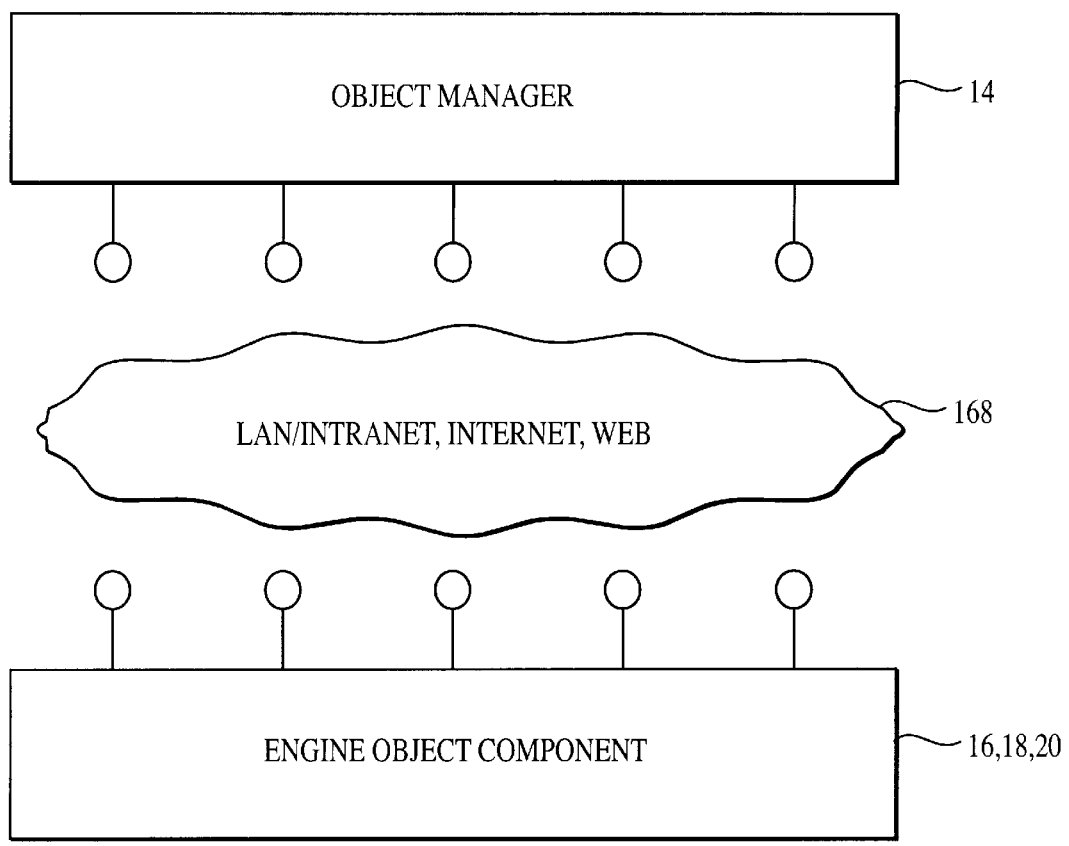
FIG. 21 is an illustration of a distributed environment or architecture for manually and/or automatically generating and/or using reusable software components for network environments, such as the Internet.

FIG. 21 is an illustration of a distributed environment or architecture for manually and/or automatically generating and/or using reusable software components for network environments, such as the Internet. As illustrated in FIG. 21, object manager 14 communicates with engine object component 16, 18, 20 via DCOM specification and a networking environment, such as the Internet, intranet, and the like 168. Other types of component communication may also be utilized that provide the capability of a distributed component interaction over a networking environment.

Figure 22:
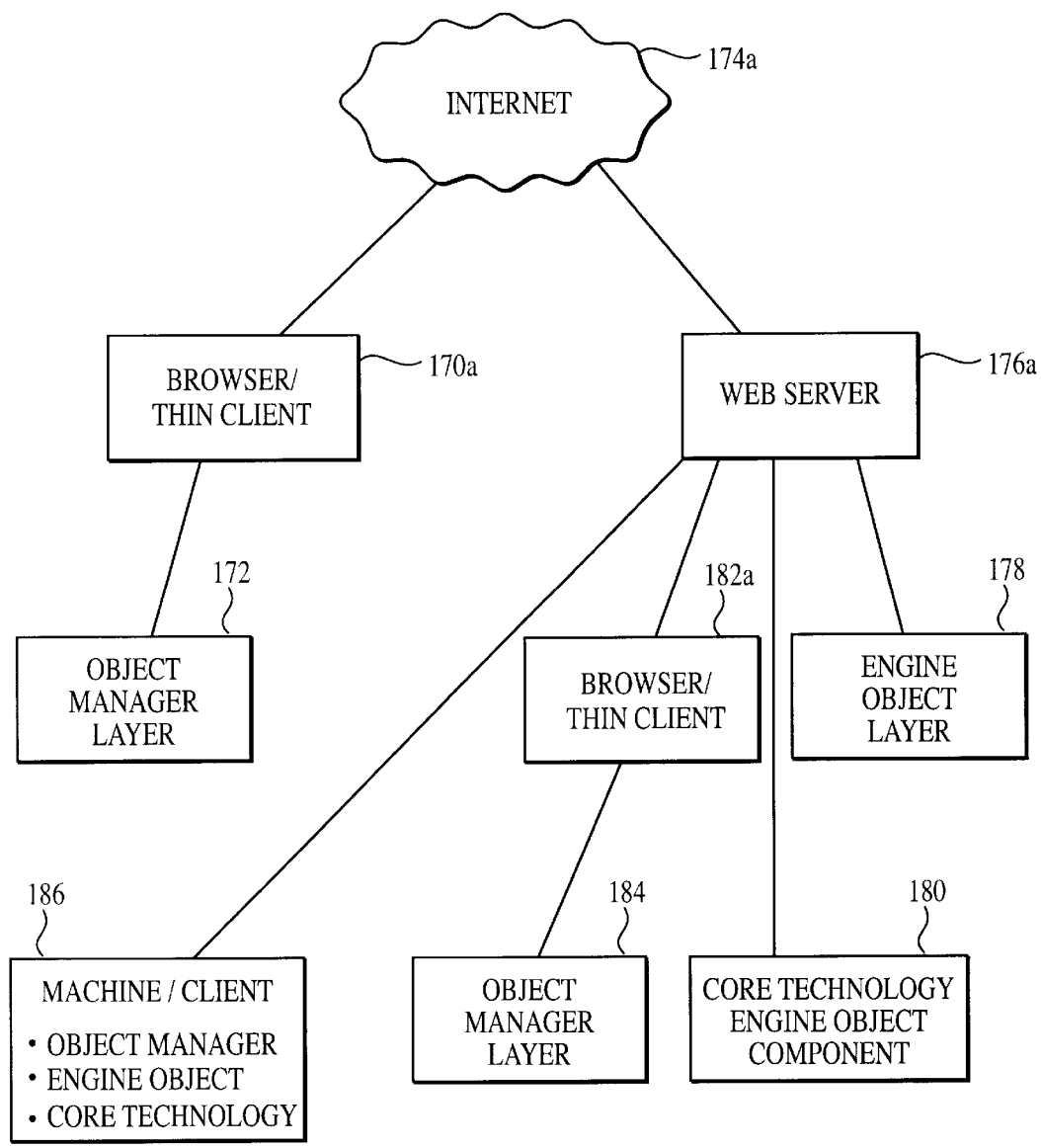
FIG. 22 is a detailed illustration of the distributed environment or architecture for manually and/or automatically generating and/or using reusable software components in the Internet environment.

FIG. 22 is a detailed illustration of the distributed environment or architecture for manually and/or automatically generating and/or using reusable software components in the Internet environment. In FIG. 22, client 170 includes object manager layer 172. Browser/thin client 170 a executes the core technology 180, via accessing engine object layer 178 managed/stored on web server 176a, and communicated via the Internet 174a.

Browser/thin client 182a, located on the same web server 176a as core technology 180 and engine object layer 178, may also be used to execute the core technology 180 via object manager layer 184. In this instance, the browser/thin client 182a with the object manager layer 184 is located on the same web server 176a as the engine object layer 178. In addition, since the present invention utilizes a communication protocol between components, for example, DCOM, that allows a client to also include both the engine object component layer and the object manager layer on the same machine 186, as well as the core technology.

Figure 23A:
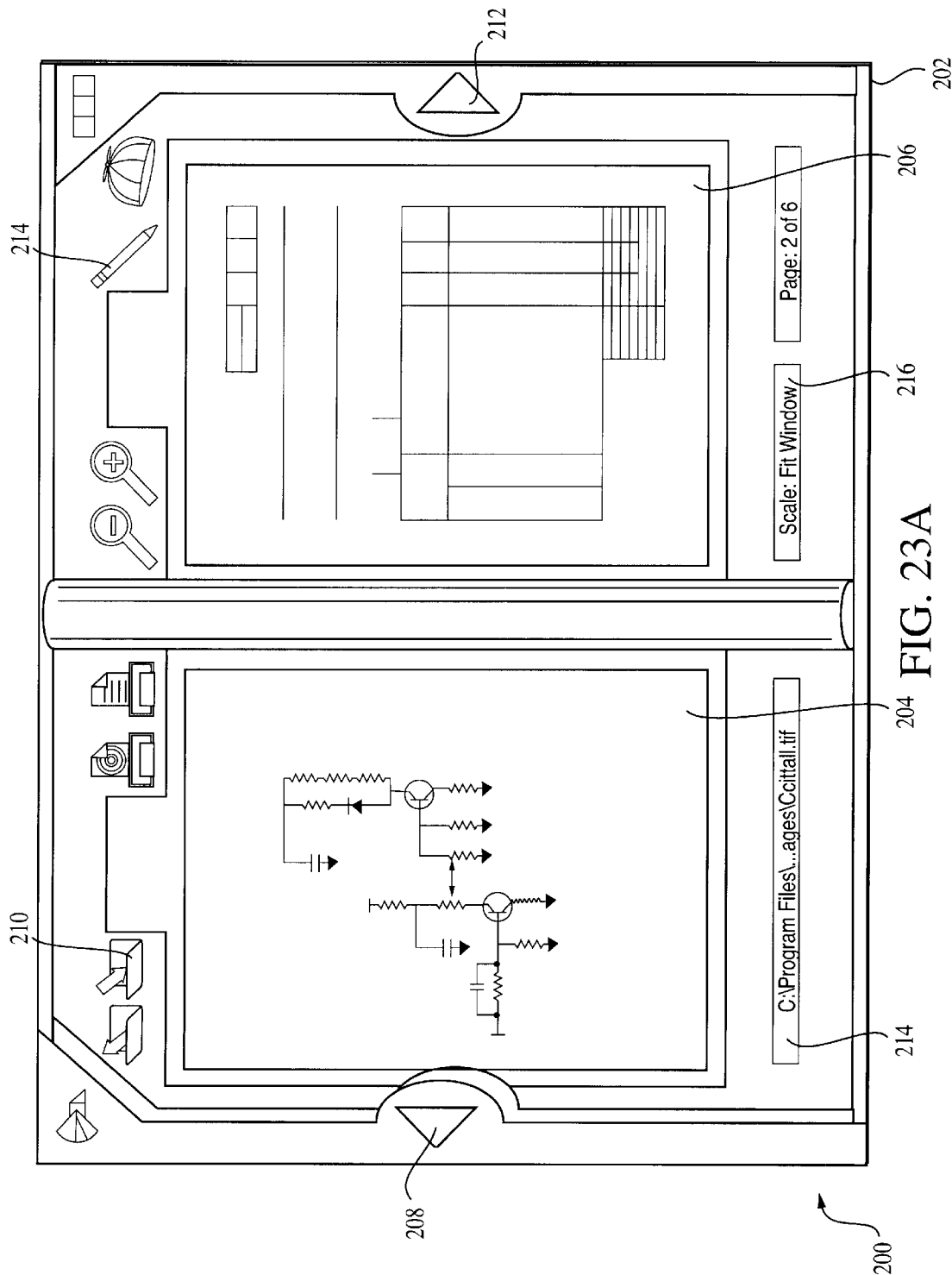
FIGS. 23A–23C are illustrations of the image viewer user interface and/or functionality associated therewith in accordance with the present invention.
Figure 23B:
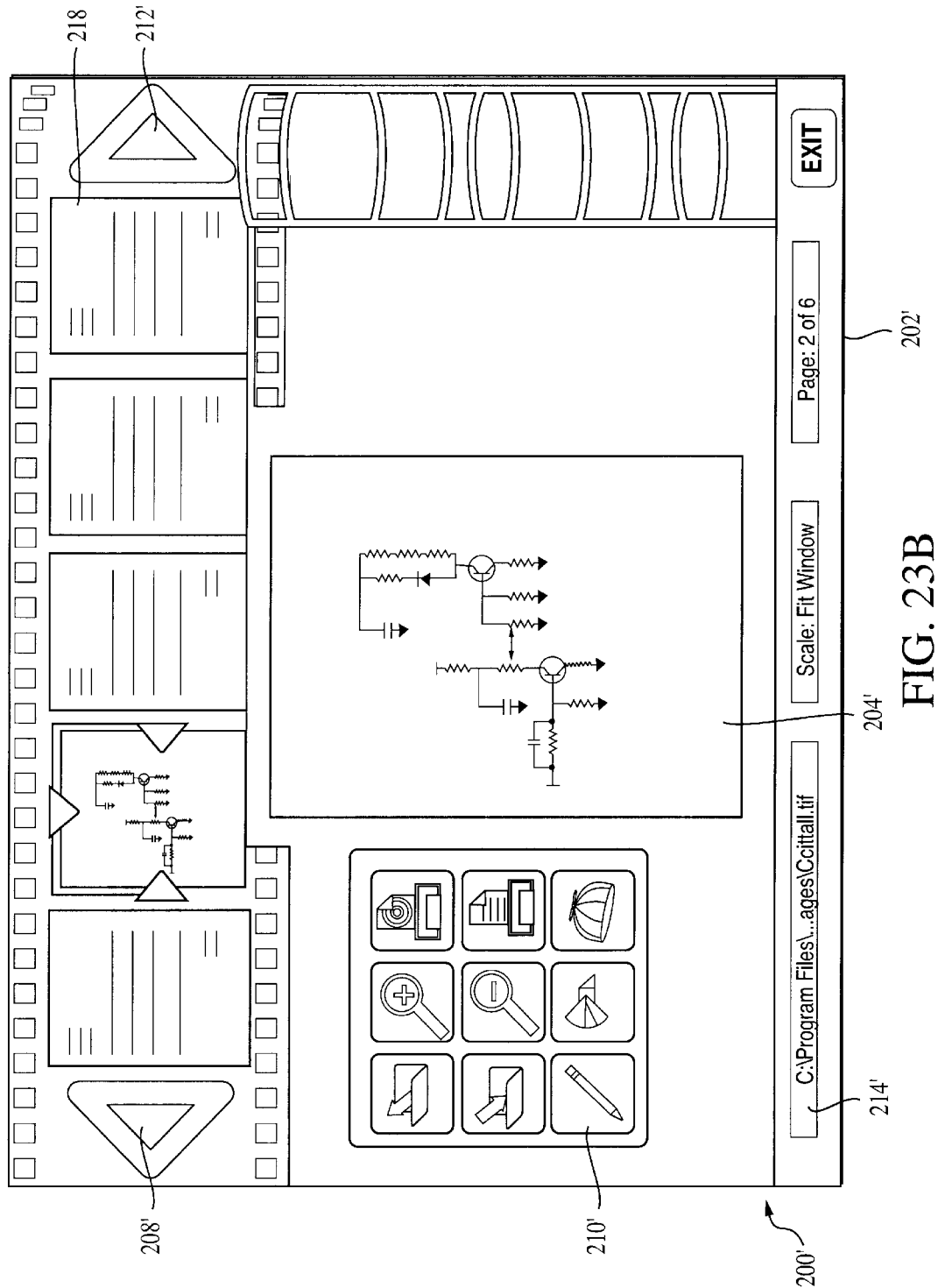
Figure 23C:
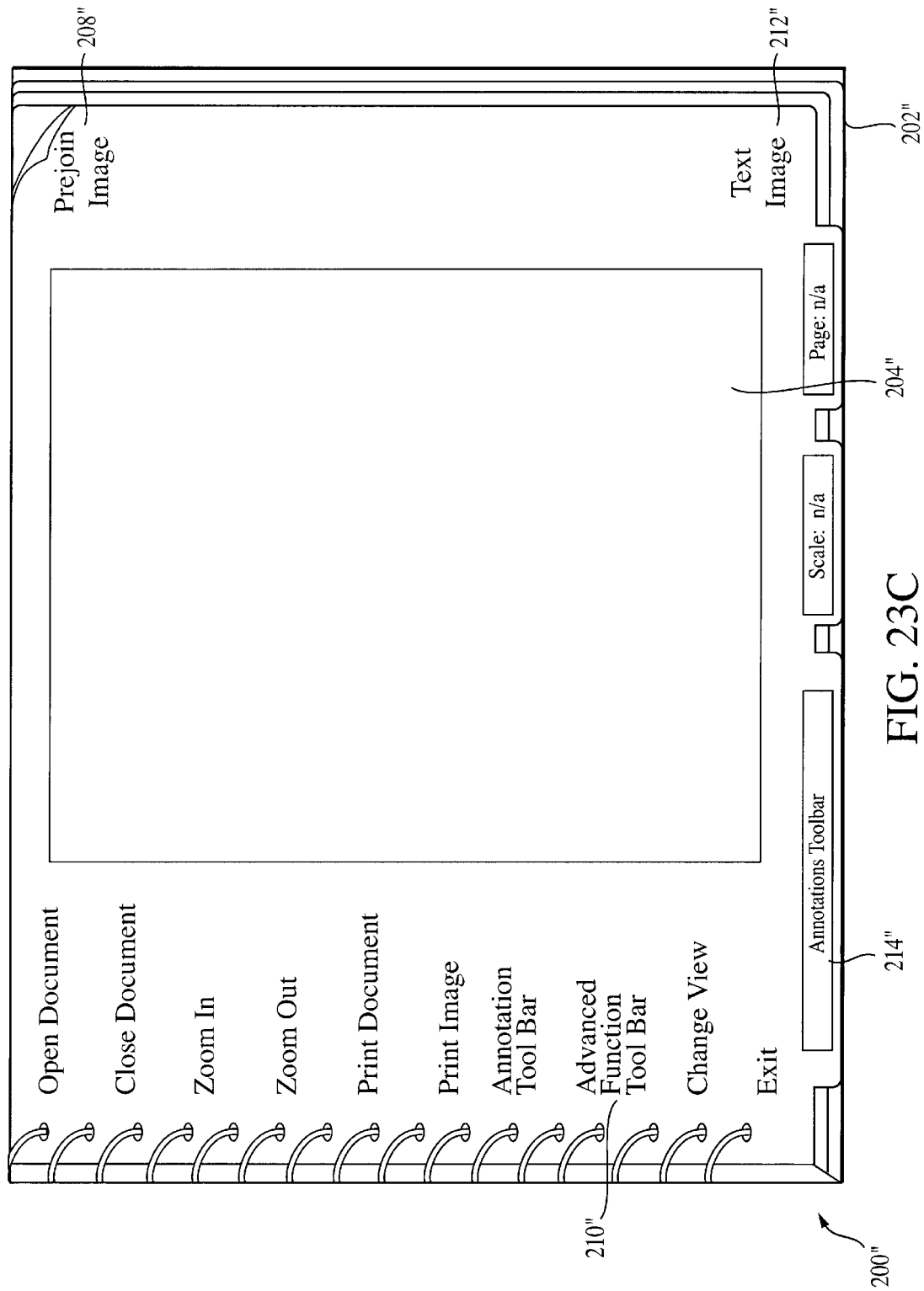

FIGS. 23A–23C are illustrations of the image viewer user selectable or configurable or programmable interface and/or functionality associated therewith in accordance with the present invention. In FIG. 23A, user interface 200 for image viewing includes viewing frame 202, with dual viewing areas 204, 206. Viewing area 204 includes at the periphery, previous page activator 208, at the top, document tools 210, and at the bottom status indicator 214. Viewing area 206 includes at the periphery, next page activator 212, at the top, document tools 214, and at the bottom status indicator 216.

Advantageously, this user interface is selectable and/or customizable by the user, as illustrated below in connection with this figure and FIGS. 23B–23C. Significantly, the image viewer provides the ability to a user to retain or develop a specific perspective on viewing a document. One of the features of the viewer is therefore the ability to change the user's perspective. For example, the user might be looking at the same document, as a book, as a film, or as a bounded or traditional book. This gives the user the ability to relate to the document in a fashion that they are comfortable with, depending on the content or depending on the user. That is, the image viewer is like a usable selectable perspective on viewing a document in a plurality of ways.

FIG. 23B is an illustration of another user selectable interface for image viewing. In FIG. 23B, user interface 200' for image viewing includes viewing frame 202', with single viewing area 204'. Viewing area 204' includes at the top left, previous page activator 208' and at the top right next page indicator 212'. Viewing area 204' also includes at the left area document tools 210', and at the bottom status indicator 214'. Viewing area 204' also includes at the top, multiple viewing page area 218, that appears and preferably moves like a film, and provides viewing of multiple consecutive or non-consecutive pages. Advantageously, this user interface is selectable and/or customizable by the user, as illustrated below in connection with this figure and FIG. 23A and FIG. 23C.

FIG. 23C is an illustration of another user selectable interface for image viewing. In FIG. 23C, user interface 200" for image viewing includes viewing frame 202", with single viewing area 204'. Viewing area 204" includes at the top right, previous page activator 208" and at the bottom left next page indicator 212". Viewing area 204" also includes at the left area document tools 210", and at the bottom status indicator 214". Viewing area thus provides a user interface to view a document that appears like a bound or more traditional book. Advantageously, this user interface is selectable and/or customizable by the user, as illustrated below in connection with this figure and FIGS. 23A–23B.

Figure 24:
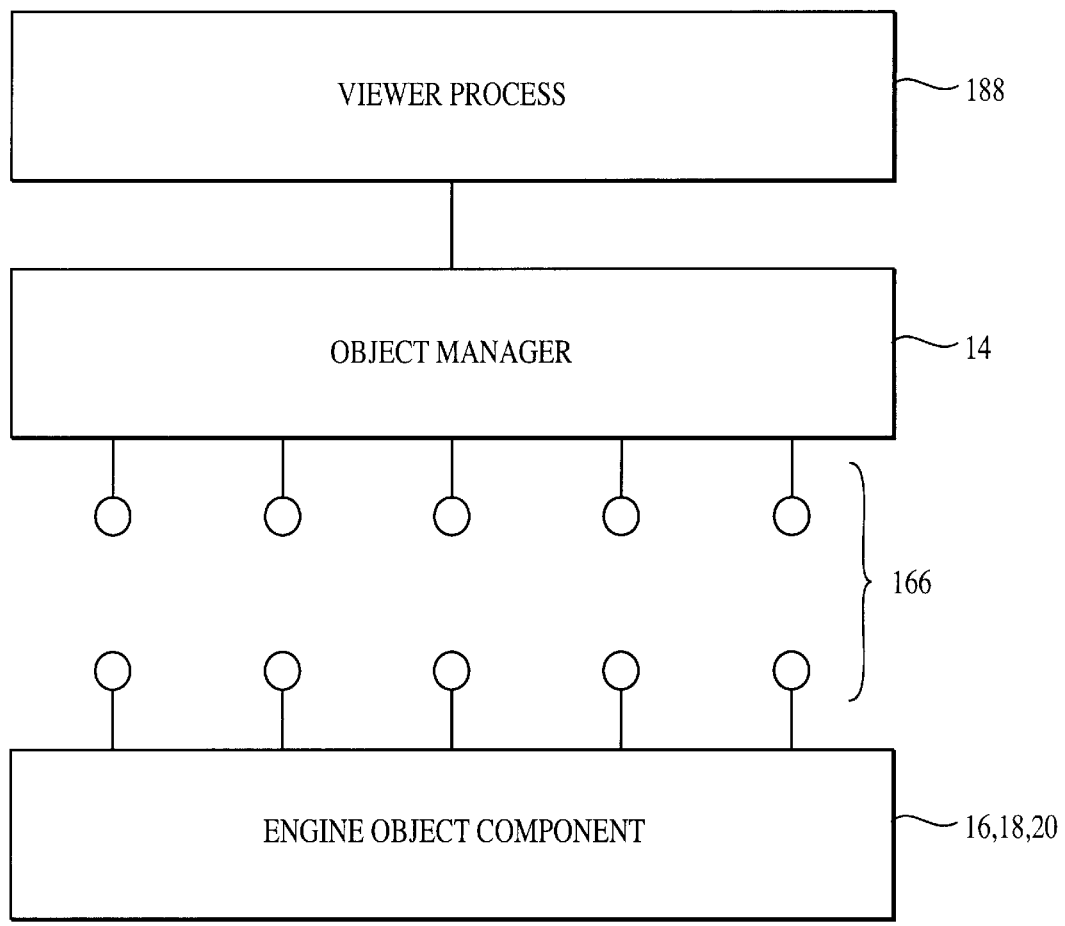
FIG. 24 is an illustration of a stand-alone and/or distributed environment or architecture for image viewer in client server and/or intranet operating environments.

FIG. 24 is an illustration of a stand-alone and/or distributed environment or architecture for image viewer in client server and/or intranet operating environments. The architecture in FIG. 24 provides the capability to perform the viewer process off-line. That is, the viewer process 188 provides an added feature on top of the object manager layer 14. As described above, object manager layer 14 is essentially an interface, and the viewer process 188 is an application that leverages the object manager layer 14.

The advantage of the viewer process 188 being built on the object manager layer 14, which is built on top of the engine object layer 16, 18, 20, is that the viewer process can offset its processing capabilities anywhere in a distributed environment. It can have the processing occur at the local station, on a server, and the like, as described below in detail. Significantly, the object manager and the engine object component are independent to provide a distributed environment for using the present invention. Rather than communicate within the same technology between the object manager and the engine object, the object manager and the engine object component communicate with each other in binary mode, via, for example, standard distributed component object module (DCOM) communication.

As illustrated in FIG. 24, object manager 14 communicates with engine object component 16, 18, 20 via DCOM specification 166. Other types of component communication may also be utilized that provide the capability of a distributed component interaction. Object manager 14 is also respectively connectable to viewer process 188.

Thus, the engine object component and the object manager can leverage current protocols to not only communicate on the same machine, but also on different machines such as a client server and/or intranet and/or Internet environment. The object manager and/or viewer process can be placed on one machine, and the engine object component on another machine and have distributed processing, what is otherwise called thin client processing, distributed processing, wide area intranet processing.

What this allows the present invention to do is to put the object manager on the thin client, who would accept the request from the user, for example, to perform the viewer process. The actual request is handled or processed by the engine object component which generally resides on the server. The engine object component contains the horse power, or the processing power to process the request.

The engine object layer is generally located in the same or substantially same location as where the core technology or engine itself is being stored. Alternatively, the engine object layer and the engine may be optionally located in a distributed environment on different machines, servers, and the like.

Figure 25:
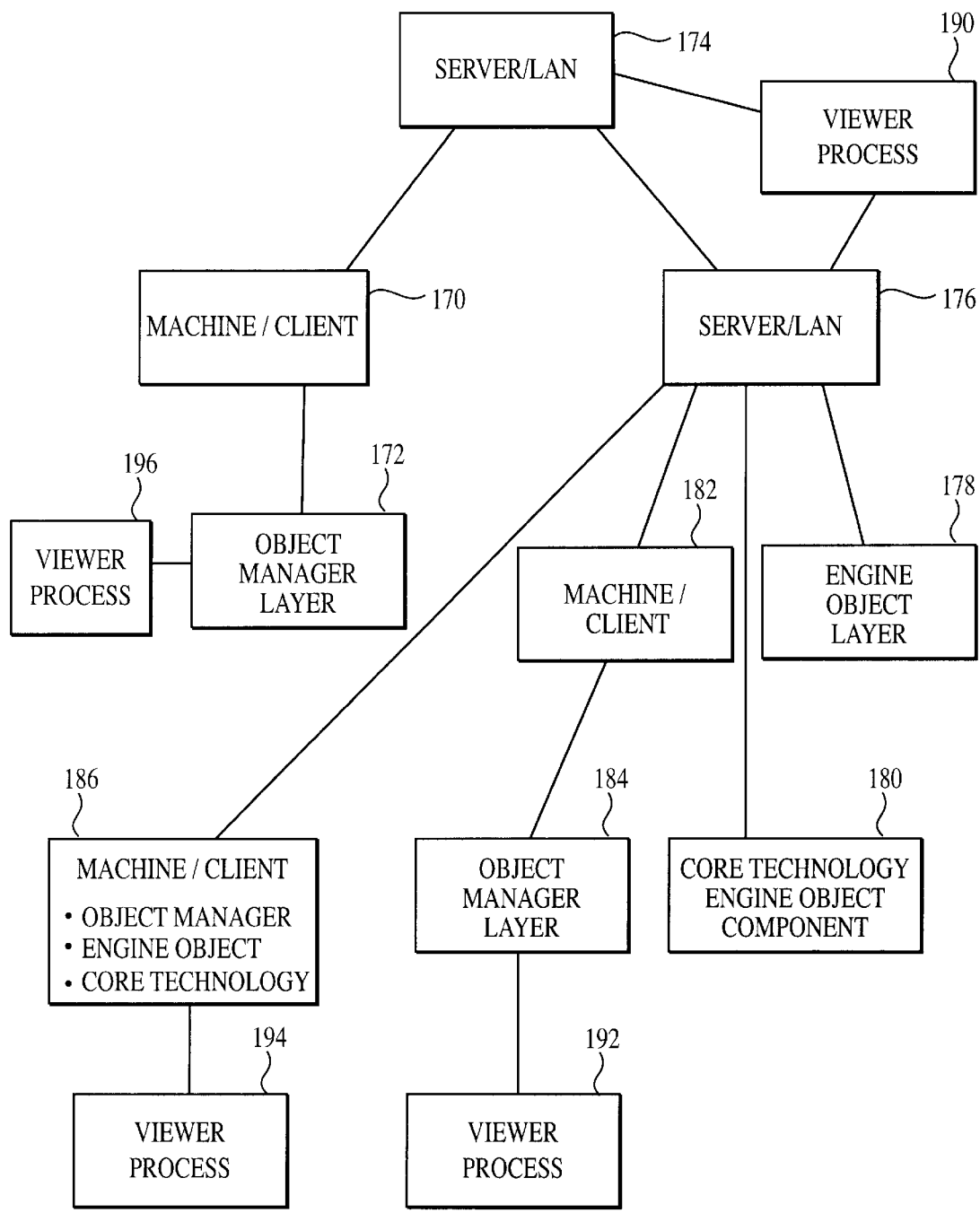
FIG. 25 is a detailed illustration of a stand-alone and/or distributed environment or architecture for image viewer in client server and/or intranet operating environments.

FIG. 25 is a detailed illustration of a stand-alone and/or distributed environment or architecture for image viewer in client server and/or intranet operating environments. In FIG. 25, client 170 includes object manager layer 172 with viewer process 192. Client 170 executes the core technology 180, via accessing engine object layer 178 managed/stored on server 176, and communicated via server 174. Viewer process 190 is also optionally available to either or both servers 174, 176.

Client 182, located on the same server 176 as core technology 180 and engine object layer 178, may also be used to execute the core technology 180 and/or viewer process 192 via object manager layer 184. In this instance, the client 182 with the object manager layer 184 is located on the same server 176 as the engine object layer 178. In addition, since the present invention utilizes a communication protocol between components, for example, DCOM, that allows a client to also include both the engine object component layer, viewer process 194 and the object manager layer on the same machine 186, as well as the core technology.

Further, since the object manager is formatted or constructed of a client technology, the object manager can sit in a standard browser. This means that anyone that has an Internet browser, i.e., anyone that has access to the world wide web (WEB) can actually access the core engine technology and/or viewer process. Thus, by structuring the architecture of the present invention as described herein, users automatically become Internet, intranet and/or WEB enabled.

The present invention also transforms the core technology and/or viewer process from essentially client based technology into a client server and/or a thin client technology. This makes the core technology high level and/or viewer process accessible, thereby transforming any core technology and./or viewer process into client server, or hidden client technology. The browser is located on the client, and the browser leverages the object manager. Accordingly, the browser optionally contains the object manager, and the object manager makes requests over, for example, the Internet, local network, and the like via a server, to the engine object. The server would be either a web server or a LAN server.

The present invention also advantageously provides the ability to have the client and the server, in a distributed environment as discussed above, or on the same machine locally. The present invention utilizes the DCOM communication protocol defining the communication protocol between the object manager and the engine object component. Accordingly, since DCOM can work on the same machine as well as in a distributed environment, DCOM does not necessitate that the engine object or the object manager component be on two separate machines.

Figure 26:
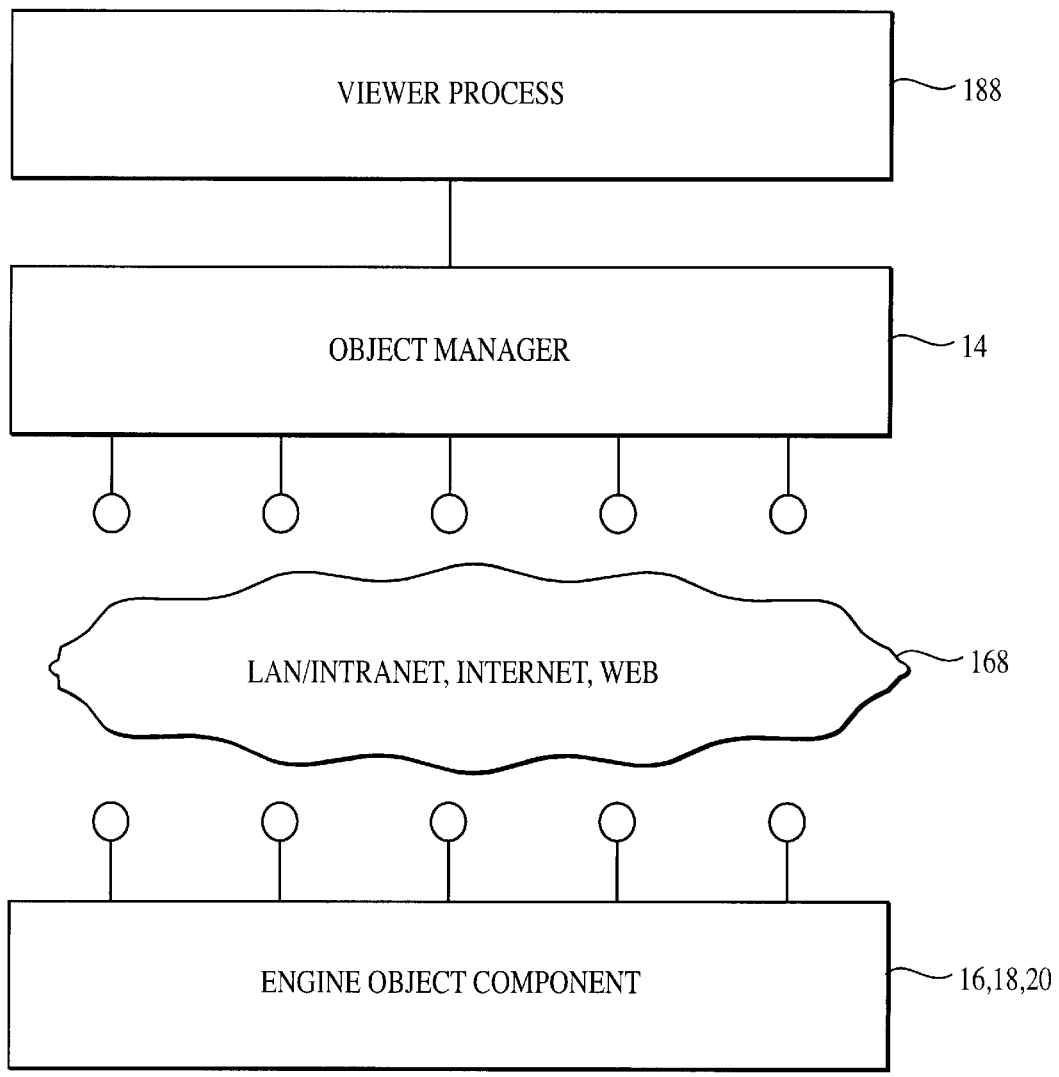
FIG. 26 is an illustration of a stand-alone and/or distributed environment or architecture for image viewer in network environments, such as the Internet.

FIG. 26 is an illustration of a stand-alone and/or distributed environment or architecture for image viewer in network environments, such as the Internet. As illustrated in FIG. 21, object manager 14 communicates with engine object component 16, 18, 20 via DCOM specification and a networking environment, such as the Internet, intranet, and the like 168. In addition, object manager layer 14 also advantageously communications with viewer process 188*a*. Other types of component communication may also be utilized that provide the capability of a distributed component interaction over a networking environment.

Figure 27:
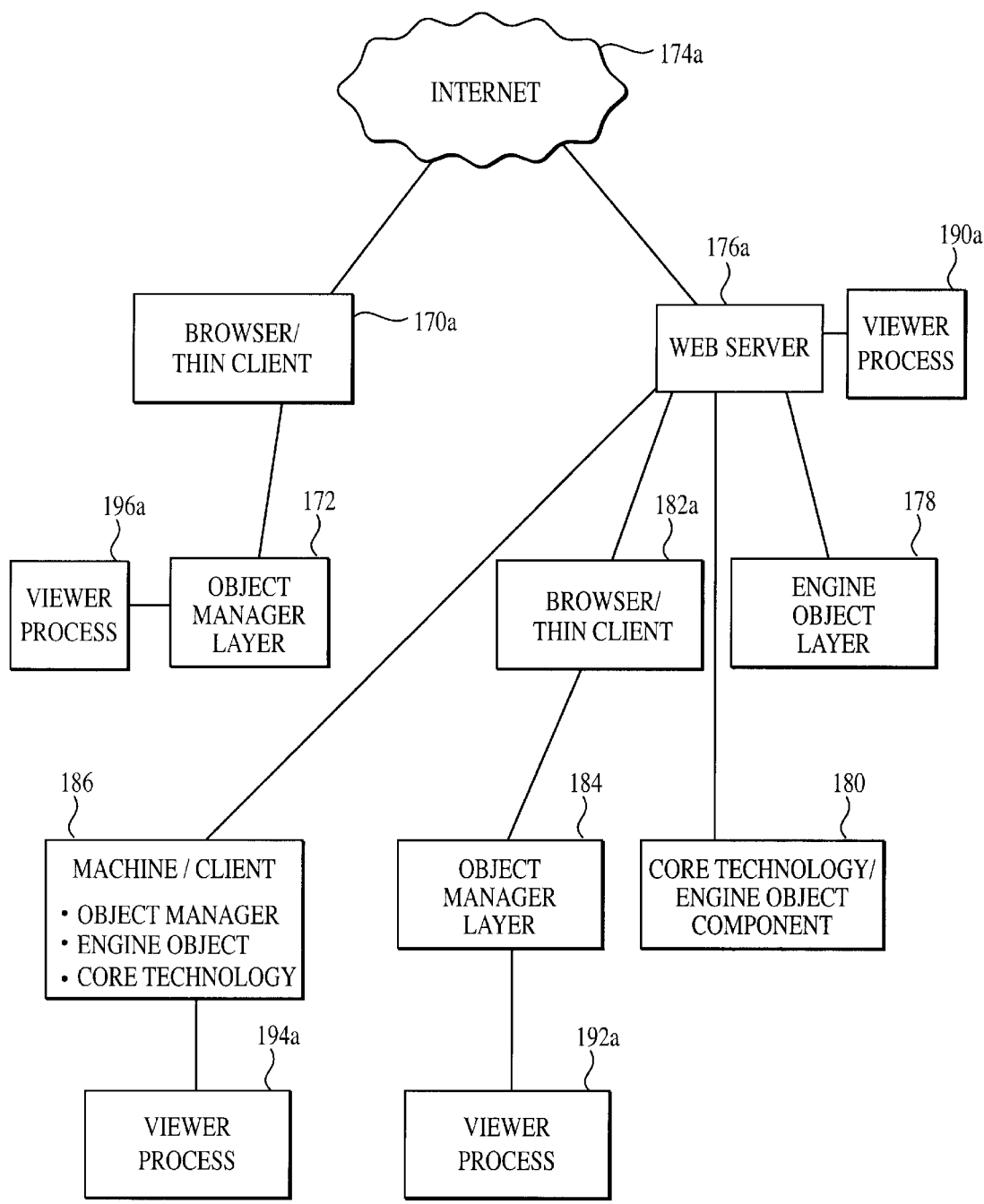
FIG. 27 is a detailed illustration of a stand-alone and/or distributed environment or architecture for image viewer in the Internet environment.

FIG. 27 is a detailed illustration of a stand-alone and/or distributed environment or architecture for image viewer in the Internet environment. In FIG. 27, client 170 includes object manager layer 172. Browser/thin client 170*a* executes the core technology 180 and/or viewer process 192*a*, via accessing engine object layer 178 managed/stored on web server 176*a*, and communicated via the Internet 174*a*. Viewer process 190 is also optionally available to web server 176*a*.

Browser/thin client 182*a*, located on the same web server 176*a* as core technology 180, viewer process 192*a* and engine object layer 178, may also be used to execute the core technology 180 via object manager layer 184. In this instance, the browser/thin client 182*a* with the object manager layer 184 is located on the same web server 176*a* as the engine object layer 178. In addition, since the present invention utilizes a communication protocol between components, for example, DCOM, that allows a client to also include both the engine object component layer and the object manager layer on the same machine 186, as well as the core technology and viewer process.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

For example, while the above discussion has separated the various functions into separate layers of functionality, the layers may be combined, physically and/or logically, and various functions may be combined together. While combining various functions into same or common layers may make implementation details more cumbersome, nevertheless, the functions described herein may still be accomplished to advantageously provide some or all of the benefits of the invention described herein.

Further, as indicated herein, the present invention may be used to automate and/or manually expedite the migration of a program specific Application Programmer Interface from an original state into a generic interface by building an object for each engine. The object advantageously provides substantially uniform access to the engine and engine settings associated with the engine. The present invention may be applied across a broad range of programming languages that utilize similar concepts as described herein.

What is claimed is:

1. A distributed computer implemented process for migrating at least one program specific Application Programmer Interface (API) from an original state into a substantially consistent interface by building an object for at least one of an engine and a viewer process, the object providing substantially uniform access to the at least one of the engine having engine settings and the viewer process, comprising the steps of:

(a) providing, on a server, the at least one engine and viewer process, each with one or more features to be executed;

(b) providing, on at least one of the server and another server connectable to the server, at least one engine component or another viewer process configured to execute the one or more features by converting the at least one program specific Application Programmer Interface (API) from the original state into the substantially consistent interface, and mapping the substantially consistent interface to the at least one of the engine and the viewer process; and (c) providing, on a client configured to be connectable to the server and optionally configured to be connectable to the another server, an object manager layer communicable with and managing the at least one engine component or the another viewer process via the substantially consistent interface.

2. A distributed computer implemented process according to claim 1, wherein the object manager layer is consistently communicable with each engine or the viewer process using the at least one engine component via the substantially consistent interface.

3. A distributed computer implemented process according to claim 1, wherein the substantially consistent interface comprises at least one of a component object module (COM) communication protocol and a distributed COM (DCOM) protocol.

4. A distributed computer implemented process according to claim 3, wherein the COM protocol comprises an ActiveX control.

5. A distributed computer implemented process according to claim 1, wherein the substantially consistent interface comprises a binary mode communication protocol.

6. A distributed computer implemented process according to claim 5, wherein the binary mode communication protocol includes a distributed component object module (DCOM) protocol.

7. A distributed computer implemented process according to claim 5, wherein the binary mode communication protocol provides the capability for the engine component to execute independent of the object manager layer.

8. A distributed computer implemented process according to claim 1, wherein the client comprises at least one of a browser and a thin client, and the server comprises a web server.

9. A distributed computer system for migrating at least one program specific Application Programmer Interface (API) from an original state into a substantially consistent interface by building an object for at least one of an engine and a viewer process, the object providing substantially uniform access to the at least one of the engine having engine settings and the viewer process, comprising:

a server configured to include
the at least one engine and viewer process, each with one or more features to be executed;
at least one engine component or another viewer process configured to execute the one or more features by converting the at least one program specific Application Programmer Interface (API) from the original state into the substantially consistent interface and mapping the substantially consistent interface to the at least one of the engine and the viewer process; and a client configured to be connectable to said server and optionally configured to be connectable to another server, said client including an object manager layer communicable with and managing the at least one engine component or the another viewer process via the substantially consistent interface.

10. A distributed computer system according to claim 9, wherein the object manager layer is consistently communicable with each engine using the at least one engine component via the substantially consistent interface.

11. A distributed computer system according to claim 9, wherein the substantially consistent interface comprises at least one of a component object module (COM) protocol and a distributed COM (DCOM) protocol.

12. A distributed computer system according to claim 11, wherein the COM protocol comprises an ActiveX control.

13. A distributed computer system according to claim 9, wherein the substantially consistent interface comprises a binary mode communication protocol.

14. A distributed computer system according to claim 13, wherein the binary mode communication protocol includes a distributed component object module (DCOM) protocol.

15. A distributed computer system according to claim 9, wherein the client comprises at least one of a browser and a thin client, and the server comprises a web server.

16. An image viewer process for viewing at least one document image including an electronic document image, and for performing viewing operations to the electronic document image by a user, comprising the steps of:

(a) selecting, by the user, one of a plurality of image viewing perspectives, each of the plurality of image viewing perspectives providing the user the capability of viewing the document image in accordance with a different predefined user perspective;

(b) selecting, by the user, using the image viewer process the document image to be viewed;

(c) retrieving, by the image viewer process, the document image;

(d) providing by at least one of the user and a computer at least one substantially consistent program specific Application Programmer Interface (API) for the at least two processing application; and (e) displaying, by the image viewer process, the document image selected by the user in said selecting step (b), using the at least one substantially consistent API provided in said providing step (d), in accordance with the one of a plurality of imaging viewing perspectives selected by the user in said selecting step (a).

17. A distributed computer implemented process including an object providing substantially uniform access to at least one engine having engine settings associated with the engine and an engine interface for accessing the engine settings and one or more features to be executed, comprising the steps of:

(a) providing, on at least one of the server and another server connectable to the server, at least one engine component configured to execute the one or more features of the engine by mapping a substantially consistent interface to the engine interface of the engine; and (b) providing, on a client configured to be connectable to the server and optionally configured to be connectable to the another server, an object manager layer communicable with and managing the at least one engine component via the substantially consistent interface.

18. A distributed computer system, comprising:

a server configured to include
  at least one engine having an engine interface, and providing one or more features to be executed;
  at least one engine component configured to execute the one or more features of the engine by mapping a substantially consistent interface to the engine interface of the engine; and a client configured to be connectable to said server and optionally configured to be connectable to another server, said client including an object manager layer communicable with and managing the at least one engine component stored on said server via the substantially consistent interface.

19. In a computer architecture including an engine management layer interfacing with a program specific application programmer interface (API) and providing engine management and administration, an engine configuration layer transforming API calls received from the program specific API into standardized calls, and an engine layer managing the standardized calls for each engine, said engine management layer configuring the computer architecture to perform at least one of the following computer implemented or computer assisted operations:

(a) loading and unloading engine dynamic link libraries into and out of memory for each engine;

(b) mapping at least one engine function to at least one corresponding engine object;

(c) providing general error detection and error correction for each engine;

(d) determining and matching arguments and returning values for mapping the at least one engine function to the at least one corresponding engine object; and (e) managing error feedback from the at least one program specific API.

20. A computer implemented method utilizing a substantially consistent interface for individual object components that represent diverse technologies, comprising the steps of:

(a) migrating a plurality of engines to the consistent interface; and (b) at least one of substantially automatically and substantially uniformly, managing the individual object components using a predefined object manager and the consistent interface.

21. A computer implemented process, comprising one or more of the following steps:

(a) providing the user an engine management function furnishing a protective wrapper for each function call associated with the engine, trapping errors, and providing error management and administration to prevent conditions associated with improper engine functioning;

(b) providing the user an engine configuration function transforming application programmer interface (API) calls received from the program specific API into standardized calls, the engine configuration function providing additional functionality, including safely loading and unloading the engine; and (c) providing the user an engine function managing the standardized calls for each engine, thereby providing substantially uniform access to the engine and the engine settings associated with the engine.

22. A distributed computer implemented process including an object providing substantially uniform access to at least one engine having engine settings associated with the engine and an engine interface for accessing the engine settings and one or more features to be executed, comprising the steps of:

(a) executing, on at least one of the server and another server connectable to the server, at least one engine component to thereby execute the one or more features of the engine via a substantially consistent interface to the engine interface of the engine; and (b) managing, on a client configured to be connectable to the server and optionally configured to be connectable to the another server, an object manager layer to manage the at least one engine component via the substantially consistent interface.

* * * * *